US006868403B1

(12) United States Patent
Wiser et al.

(10) Patent No.: US 6,868,403 B1
(45) Date of Patent: *Mar. 15, 2005

(54) SECURE ONLINE MUSIC DISTRIBUTION SYSTEM

(75) Inventors: Philip R. Wiser, Redwood City, CA (US); Andrew R. Cherenson, Los Altos, CA (US); Steven T. Ansell, Fremont, CA (US); Susan A. Cannon, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,061

(22) Filed: Mar. 9, 2000

Related U.S. Application Data

(63) Continuation of application No. 09/020,025, filed on Feb. 6, 1998.

(51) Int. Cl.[7] .............................................. G06F 17/90
(52) U.S. Cl. ................................ 705/51; 705/5; 705/1; 705/56; 705/78
(58) Field of Search ................................ 705/1, 51, 78, 705/76

(56) References Cited

U.S. PATENT DOCUMENTS 4,747,139 A    5/1988 Taaffe (List continued on next page.)

FOREIGN PATENT DOCUMENTS

EP          0 309 298    *   3/1989

(List continued on next page.)

OTHER PUBLICATIONS

Wilson, David L. "Satrt–Up Could Pur Music Retail Business Online." San Jose Mercury News. Jun. 16, 1997. DIALOG/.*

(List continued on next page.)

*Primary Examiner*—John W. Hayes
*Assistant Examiner*—James A. Reagan
(74) *Attorney, Agent, or Firm*—Woodcock Washburn LLP

(57) ABSTRACT

A computer implemented online music distribution system provides for the secure delivery of audio data and related media, including text and images, over a public communications network. The online music distribution system provides security through multiple layers of encryption, and the cryptographic binding of purchased audio data to each specific purchaser. The online music distribution system also provides for previewing of audio data prior to purchase. In one embodiment, the online music distribution system is a client-server system including a content manager, a delivery server, and an HTTP server, communicating with a client system including a Web browser and a media player. The content manager provides for management of media and audio content, and processing of purchase requests. The delivery server provides delivery of the purchased media data. The Web browser and HTTP server provide a communications interface over the public network between the content manager and media players. The media player provides for encryption of user personal information, and for decryption and playback of purchased media data. Security of purchased media data is enhanced in part by the use of a personal, digital passport in each media player. The digital passport contains identifying information that identifies the purchaser, along with confidential information, such as credit card number, and encryption data, such as the media player's public and private keys. The media player encryption data is used to encrypt purchased media data, which is decrypted in real time by the media player. The media player also displays confidential information, such as the purchaser's credit card number, during playback.

92 Claims, 11 Drawing Sheets

U.S. PATENT DOCUMENTS

| | | | |
|---|---|---|---|
| 4,817,140 A | | 3/1989 | Chandra et al. |
| 5,003,410 A | | 3/1991 | Endoh et al. |
| 5,033,084 A | | 7/1991 | Beecher |
| 5,034,980 A | | 7/1991 | Kubota |
| 5,155,768 A | | 10/1992 | Matsuhara |
| 5,191,573 A | | 3/1993 | Hair ............................ 369/84 |
| 5,199,066 A | | 3/1993 | Logan |
| 5,418,713 A | * | 5/1995 | Allen ........................... 705/32 |
| 5,509,074 A | * | 4/1996 | Choudhury et al. ......... 713/176 |
| 5,592,651 A | | 1/1997 | Rackman |
| 5,621,796 A | | 4/1997 | Davis et al. ................... 705/68 |
| 5,623,547 A | | 4/1997 | Jones et al. ................... 705/68 |
| 5,636,276 A | | 6/1997 | Brugger ......................... 380/4 |
| 5,661,799 A | | 8/1997 | Nagel et al. |
| 5,673,316 A | * | 9/1997 | Auerbach et al. ............. 705/51 |
| 5,675,734 A | | 10/1997 | Hair ............................ 705/26 |
| 5,677,953 A | | 10/1997 | Dolphin |
| 5,715,314 A | | 2/1998 | Payne et al. .................. 705/78 |
| 5,724,424 A | | 3/1998 | Gifford ........................ 705/79 |
| 5,734,823 A | | 3/1998 | Saigh et al. ........... 395/200.06 |
| 5,734,891 A | | 3/1998 | Saigh .......................... 395/610 |
| 5,742,845 A | | 4/1998 | Wagner ........................ 710/11 |
| 5,745,568 A | | 4/1998 | O'Connor et al. |
| 5,754,649 A | | 5/1998 | Ryan et al. |
| 5,757,907 A | | 5/1998 | Cooper et al. |
| 5,778,421 A | | 7/1998 | Nagano et al. |
| 5,790,677 A | * | 8/1998 | Fox et al. ...................... 705/78 |
| 5,794,217 A | | 8/1998 | Allen ........................... 705/27 |
| 5,809,144 A | | 9/1998 | Sirbu et al. .................... 705/53 |
| 5,857,021 A | | 1/1999 | Kataoka et al. |
| 5,889,860 A | | 3/1999 | Eller et al. .................... 705/51 |
| 5,892,900 A | | 4/1999 | Ginter et al. ................ 713/200 |
| 5,900,564 A | * | 5/1999 | Kurakake ................. 84/477 R |
| 5,910,987 A | | 6/1999 | Ginter et al. .................. 705/52 |
| 5,915,019 A | | 6/1999 | Ginter et al. .................. 705/54 |
| 5,917,912 A | | 6/1999 | Ginter et al. ................ 713/187 |
| 5,920,861 A | | 7/1999 | Hall et al. ...................... 707/9 |
| 5,943,422 A | | 8/1999 | Van Wiet et al. ............. 705/54 |
| 5,949,876 A | | 9/1999 | Ginter et al. .................. 705/50 |
| 5,982,891 A | | 11/1999 | Ginter et al. .................. 705/54 |
| 6,005,939 A | | 12/1999 | Fortenberry et al. .......... 705/76 |
| 6,061,448 A | * | 5/2000 | Smith et al. ................. 380/282 |
| 6,112,181 A | | 8/2000 | Shear et al. .................... 705/1 |
| 6,112,239 A | * | 8/2000 | Kenner et al. .............. 709/224 |
| 6,138,119 A | | 10/2000 | Hall et al. ...................... 707/9 |
| 6,157,721 A | | 12/2000 | Shear et al. ................. 380/255 |
| 6,185,683 B1 | | 2/2001 | Ginter et al. ................ 713/176 |
| 6,189,098 B1 | | 2/2001 | Kaliski, Jr. |
| 6,236,971 B1 | | 5/2001 | Stefik et al. .................... 705/1 |
| 6,237,786 B1 | | 5/2001 | Ginter et al. ................ 213/153 |
| 6,240,185 B1 | | 5/2001 | Van Wie et al. ............ 380/232 |
| 6,253,193 B1 | | 6/2001 | Ginter et al. .................. 705/57 |

FOREIGN PATENT DOCUMENTS

| | | | | |
|---|---|---|---|---|
| EP | 90 309 298 | * | 3/1989 | |
| EP | 0715243 A1 | | 6/1996 | |
| EP | 0 756 279 A2 | | 1/1997 | ........... G11B/20/00 |
| EP | 0843449 A2 | | 5/1998 | |
| FR | 2733068 | | 4/1995 | |
| WO | WO 97/44736 | | 11/1997 | ........... G06F/12/14 |

OTHER PUBLICATIONS

Digital River, "Fraud Prevention Technology," Printed from website http://www.digitalriver.com/

One–page printed papers from website http://www.digital-river.com/ on Digital River's "Mission," "Technology," "Security," "Privacy," and "How It Works".

Blaze et al., "Decentralized Trust Management," originally published in *Proc. IEEE Conference on Security and Privacy*, Oakland, CA, May 1996.

Schneier and Kelsey, "Cryptographic Support for Secure Logs on Untrusted Machines," *The Seventh USENIX Security Symposium Proceedings*, USENIX Press, Jan. 1998, pp. 53–62.

Digital River, "Marketing Software on the Internet: A White Paper," Printed from website http://www.digitalriver.com/.

Digital River, "Technology Solutions to Electronic Transactions: A White Paper," Printed from website http://www.digitalriver.com/.

* cited by examiner

SECURE ONLINE MUSIC DISTRIBUTION SYSTEM

This is a continuation of U.S. patent application Ser. No. 09/020,025 filed Feb. 6, 1998.

FIELD OF THE INVENTION

This invention relates generally to the field of online commerce, and more particularly, to system and methods for the online distribution of digital media data over public communication networks.

BACKGROUND OF THE INVENTION

The rapid development of the Internet and the World Wide Web has primarily focused on these technologies as vehicles for online commerce for the distribution of their products. From a commercial perspective, "distribution" includes the two distinct phases of purchase and delivery. Many companies only support the purchase phase online. Typically, this is done by providing an online catalog of products and enabling a consumer to view the catalogs and provide payment information, such as a credit card, to the company's Web site. The purchased merchandise is then delivered off-line by mailing to the purchaser. Overwhelmingly, the majority of products purchased in this manner are traditional non-digital media, such as books, clothing, food products, and the like. Even digital media, such as computer software, video, and audio is purchased in this manner, with product selection and purchase being made online but the delivery being made conventionally by mailing the digital media to the purchaser on a conventional medium such as floppy diskette, CD-ROM, video cassette, audio tape or audio CD.

In contrast to conventional online purchase-off-line distribution systems, a complete system for the online distribution of digital media, such as digital audio, would provide online support for both the purchase and delivery phases. Such an online distribution system presents a number of special challenges not associated with non-digital products. For example, with conventional distribution of music on CD and cassette tapes, losses from copyright infringement from illegal copying of music are estimated at about $1 billion worldwide, annually. The susceptibility of digital audio to unauthorized copying, and the ability to create perfect duplicates, raises the specter of even more significant losses to the music industry, and has been the single greatest factor in the music industry's reluctance to make music available for purchase over the Internet. Thus, an online music purchase and distribution system must be demonstratively secure from a large variety of attacks and misuses in order to preserve the music owner's intellectual property rights.

At least three types of risks are present in the online distribution of music. First, there is a considerable security risk in simply maintaining digital media products in computer systems connected to public networks such as the Internet for access by consumers. In order to effectively enable purchasers to review and purchase digital media, the audio distributor's computer system storing such media must be networked. However, given the commercial value of such digital media, whether audio data, video data, software, or the like, such sites would be likely targets of computer-based attacks. Further, the very presence of an online commerce system is itself an inducement to 'crackers' to attempt to break the security controls of such a system and gain access thereto. Thus, an online music distribution system for digital media must be secure from such direct attacks. Further, if the online music distribution system is compromised, it is desirable that the underlying media itself be secure against unauthorized copying.

Similarly, the protocols and transmission mechanisms by which an online music distribution system delivers digital audio to a legitimate purchaser must also be secure, to prevent unauthorized users from intercepting deliveries of the audio and related media over the network.

Finally, once the audio product has been delivered to a user, it must be made secure against unauthorized duplication by the user or by others.

These constraints on an online music distribution system are in conflict with many of the features consumers want in terms of flexibility and ease of use. In particular regard to the purchase of audio data, such as songs and related media (e.g., the lyrics, graphics, liner notes which typically accompany conventional retail forms of audio) consumers want to be able to sample audio products prior to purchasing. It is desirable for such an online music distribution system then to provide some mechanism by which users can play limited portions of songs and view related media without having to purchase the song. In addition, a consumer should be able to pass on preview music to other potential new customers.

Similarly, purchasers of music in traditional forms such as compact disc or cassettes are accustomed to simple, easy to use consumer devices, such as portable compact disc players to tape players. For the successful distribution of music over the Internet, the security requirements must not unduly interfere with consumer's ease of use of the system. A consumer should be able to purchase and playback audio easily and securely. However, the security measures, particularly the encryption mechanisms, should make the purchased audio unusable outside of the specific devices and mechanism designed to cooperate with the distribution system.

Similarly, consumers are accustomed to being able to play music purchases anywhere they can carry a CD and CD player. Consumers will expect similar portability when purchasing digital media over the Internet. Accordingly, a desirable online music distribution system should allow a consumer to playback purchased audio not merely on a single computer, but on any platform equipped with an appropriately licensed playback device and the licensee's personal identification.

Also, given the very high audio fidelity available today with conventional CD products, audio purchased over the Internet from an online music distribution system must have at least the same level of fidelity, or otherwise consumers will not purchase such products. Thus, any encryption or compression methods used must not induce significant signal loss, or impair playback performance.

There already exists today various forms of online payment processing systems, such as credit card and debit card authorization systems. In addition, many new forms of online payment are now developing, and will continue to develop in the future, including digital cash, micropayments, and the like. Accordingly, an online music distribution system should not require a single form of payment, or use a proprietary payment processing system. Rather, a desirable online music distribution system should be adaptable to integrate with all forms of payment processors. Similarly, many merchants are now providing their own online commerce servers from which they offer and distribute products as the retail vendor of such products. A desirable online music distribution system should integrate with any variety of merchant systems.

An online music distribution system should also allow for the recovery of secured audio content by consumers who have lost the identification or other security information (such as an encryption key) required to use their purchases. In addition, independent agencies which police copyright infringements should also be able to recover infringing copies, and identify the creator of such infringements.

SUMMARY OF THE INVENTION

The present invention provides a secure online music distribution system that provides consumers with flexibility and ease of use in the selection, previewing, downloading, and transporting of audio and other digital media over the Internet, and that provides for security of the media throughout the distribution system.

An online music distribution system in accordance with the present invention includes a variety of cooperative components that communicate over a public network, preferably the Internet. These components include a content manager, one or more delivery servers, a media data file system and media information database. Internet communications by the system are facilitated by HTTP servers. Any number of individual purchasers use client computer systems with Web browsers and media players.

Secure distribution of audio is provided by three aspects of the present invention. First, unlike conventional media delivery systems, the present invention supports both phases of distribution online: the commercial phase of a purchase transaction, such as authentication of the purchaser and payment, and the delivery of the purchased media itself. This aspect of the online music distribution system is provided by having the content manager control the storage of the audio data in the media data file system, and manage the commercial aspects of a purchase or preview transaction with the purchaser. On the other hand, the actual delivery of the audio data is managed by one of the delivery servers.

Given the security needs of limiting copying, preventing attacks on the system directly and during delivery of products, the present invention provides secure protocols for consummating the purchase transaction, and for delivering the audio and other media. First, the media player of the user and the user's identity is authenticated by the content manager. Second, the specific media being purchased is encrypted with information uniquely identifying the purchaser (and distinct from mere encryption keys), and known only to the media player of the purchaser. In this manner, only the purchaser's media player can decrypt and playback the purchased audio. Third, the specific purchase transaction, is itself represented by a secure and trusted object which is passed between the content manager, media player, and delivery server. Fourth, once the media is delivered to the media player by the delivery server, it can only be played back in the presence of various decryption keys and confidential personal information of the purchaser.

In another aspect of the invention, encrypted and un-encrypted versions of a song are combined into a single media data file, along with descriptive text, artwork, and other information. The encrypted version of the song is a high fidelity audio image that is to be purchased. The un-encrypted versions of a song are either selected portions, or the entire song, but recorded with lesser quality, such as increased compression and/or lower sample rate. These un-encrypted, lower quality 'clips' are available free for previewing by the consumer in order to decide whether or not to purchase the high fidelity version. In addition, descriptive information, such as cover art, lyrics, credits and the like, is also available for previewing.

In another aspect of the invention, there is provided a complete security protocol that protects the purchase-quality audio images from creation by an artist all the way through purchase and playback by the user. The purchase-quality audio data is encrypted when created by the artist with a media key, a strong random number generated by an audio authoring tool. This media key is then encrypted with a public key of the content manager. The encrypted high-quality version of the song is combined with the lower-quality un-encrypted versions, descriptive information and the media key into the media data file. The media data file is uploaded to the content manager for storage in the media data file system, where it can now be purchased by consumers. While in storage in the online music distribution system, the audio images remain encrypted and tied to the specific content manager.

To purchase a media data file, a consumer first registers with the media licensing center to obtain a digital passport. The passport is a combination of data that includes personal information uniquely identifying a user, information confidential to that user, and encryption key information used to encrypt media data for that person's use. The identifying information is typically the user's name, address, and so forth. The confidential information is preferably some information of value to the user, such as the user's credit card number. This information is combined in the passport with a public-private key pair generated by the media licensing center, into a digital certificate authenticating their identity. The private key information is then separately encrypted with symmetric keys, including a user-selected passphrase, and a strong random key.

The passport supports security during various phases of the purchase of media data files. First, the certificate is used to authenticate the purchaser to the content manager and delivery server.

Second, the purchaser's public key from the passport is used by the content manager to encrypt the media key for the media data file being purchased. In this manner, only the purchaser's media player can decrypt the media key for the purchased audio and playback the music. When the media player receives a media data file for playback, it uses the private key stored in the passport to decrypt the media key included in the media data file. The media key is then used to decrypt the audio image for playback at the user's machine.

Third, the passport's inclusion of confidential information (such as the user's credit card number) is further designed to deter the purchaser from simply copying their passport and purchased audio and giving them to another person. During playback the media player displays the confidential inforemation of the user on the computer display. The display of the confidential information provides a powerful incentive for the purchaser to protect the integrity of their passport, and hence indirectly protect the purchased media itself.

The integrity of the purchase and delivery phases of a transaction are secured by a protocol between the content manager, delivery server, the user's Web browser, and media player that uses the purchaser's passport, and a separate trusted data object called a media voucher. The media voucher uniquely identifies the media being purchased, the specific purchase transaction, and the specific delivery server to deliver the purchased media to the media player. The specific purchase transaction is represented by a voucher ID generated by the content manager. The media voucher is provided by the content manager to the user's Web browser once the user's credit card has been checked and payment authorized. The content manager also provides a receipt toke-.t, a strong random number the media player will use to complete the transaction with the specified delivery server. This completes the purchase phase of the transaction.

The delivery phase of the transaction then takes place between the media player and the delivery server, with validation of the transaction provided by the content manager. The media player creates a message authentication of the receipt and voucher ID from the media voucher and the consumer's certificate from the passport. This step binds the specific transaction to the purchase. These data are transmitted to the delivery server. The delivery server validates the message authentication data, using the voucher ID and a certificate chain from the packet and the receipt obtained from the content manager. This step validates the identity of the media player to the delivery server. The content manager encrypts the media key of purchased audio images with the purchaser's public key. The delivery server can then deliver the audio to the purchaser's media player. In this way only the purchaser can decrypt the purchased audio.

DETAILED DESCRIPTION

System Overview

Figure 1:
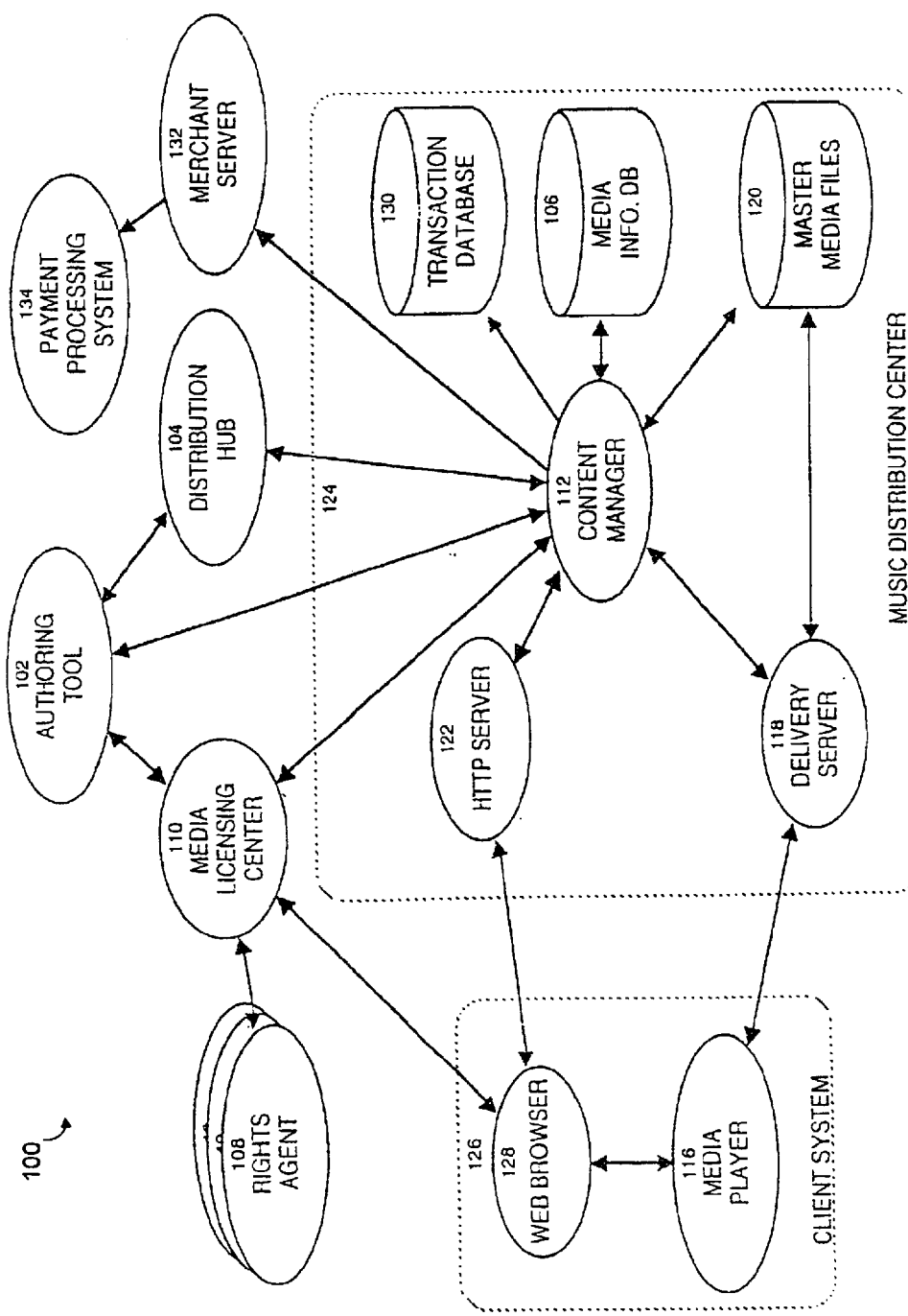
FIG. 1 is an illustration of a secure online music distribution system in accordance with the present invention.

Referring now to FIG. 1, there is shown an illustration of a system for the secure distribution of music and related media over a public telecommunications network, such as the Internet. The system employs a client-server architecture. The system includes a music distribution center 124 which operates with any number of client systems 126, only one of which is illustrated for convenience. The music distribution center 124 includes a content manager 112, and at least one delivery server 118, an HTTP (HyperText Transfer Protocol) server 122. The content manager 112 maintains a media information database 106, a master media file system 120, and a transaction database 130. In addition, the music distribution center 124 interfaces with a media licensing center 110, which in turn communicates with one or more distributed rights agent servers 108 and merchant servers 132. The merchant servers 132 interface with various payment processing systems 134. Client systems 126 include a media player 116 and a Web browser 128. In a preferred embodiment, there are additional delivery servers 118 and media licensing centers 110 that operate independently and externally to a music distribution center 124, and interface with it to provide the same functionality as its local complementary components.

The client systems 126 have two basic components, a media player 116 and a Web browser 128. The Web browser 128 may be conventional, with the addition of an interface to the media player 116 for passing information to the media player 116.

The music distribution center 124 operates on server-class computer systems, such as Sun Microsystems SPARCstations™ executing UNIX™ based operating system, or Intel Pentium™ based computers executing Microsoft Corp.'s Windows NT™ operating system. The media player 116 is a software product capable of executing on a variety of computer platforms, also including Apple Computer, Inc.'s Macintosh™ systems executing Apple's MacOS™ operating system, and Intel Pentium based computers executing Microsoft Corp.'s Windows95 or Windows NT operating systems.

The music distribution system 124 communicates with the various other components such as the client systems 126, media licensing centers 110, merchant servers 132, authoring tools 102, and rights agents 108 over a public communication network, preferably the Internet, using conventional TCP-IP communication protocols for insecure channels, and a secure protocol over TCP, such as Netscape Communication Inc.'s Secure Sockets Layer v. 3 (SSL), for secure communications. The Web browser 128 of the client system 126 interfaces with the music distribution center 124 via the World Wide Web portion of the Internet using conventional HTTP and HTTP over SSL, and the music distribution center's HTTP server 122.

Data Objects

The present invention separates the management and administration of the purchase of the media content from the delivery of that media content to purchasers. This separation is supported in two ways. First, the administration and management of all purchases and other transactions is handled primarily by the content manager 112, and the delivery of the purchased media content is provided by the delivery servers 118. Second, three distinct data objects are used to encapsulate the information used in various stages of the various transactions. Media content is stored in media data files that are encrypted, when purchased, using encryption keys of the purchasers. Second, a media voucher object is used to encapsulate the information specific to an individual transaction, including the media data being purchased, and the delivery server 118 for delivering the media data. Third, the link between these data entities is provided in a passport object which encapsulates the user's personal confidential information, and encryption keys.

Media Data File

Figure 2:
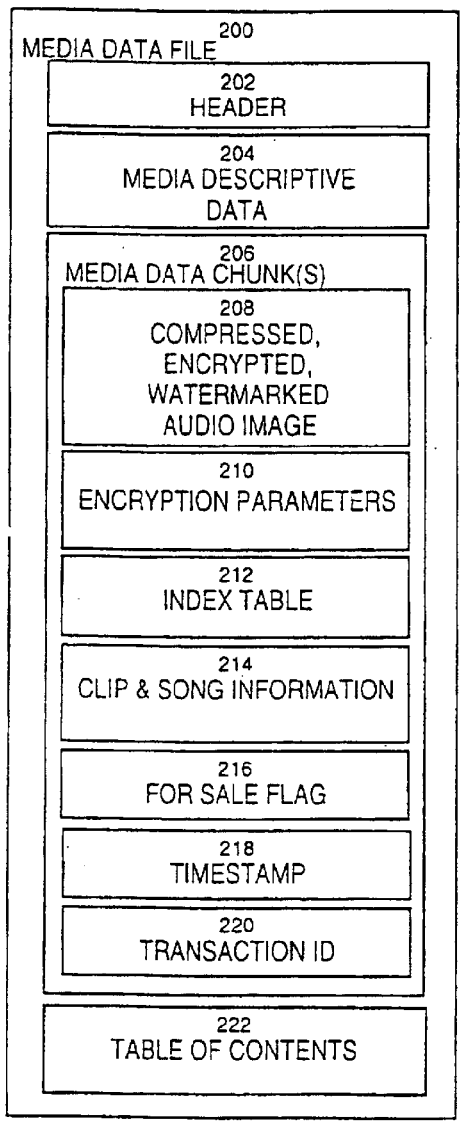
FIG. 2 is an illustration of a media data file.

Referring now to FIG. 2 there is shown an illustration of a media data file in accordance with one embodiment of the invention. The media data files 200 are stored in the master media file system 120. Each media data file 200 includes the following:

Header 202 generally defines the information needed to decode the media data file 200. This information includes a file format version, the location (offset) of the table of contents 222 in the file, and security information, such as authentication information including digital signature of data extracted from the file.

Media descriptive data 204 is text and image data associated with the audio files. These data include descriptive text, such as title, artist, lyrics, and liner notes, promotional art image data, and cover art image data. These data are preferably digitally signed to prevent them from being changed. The author of the file determines whether the media descriptive data 204 is encrypted or not. This allows the liner notes and credits data, for example, to be freely viewed by the potential purchasers, and thereby allows them to determine whether they are interested in purchasing the music, while ensuring other data that have commercial value, such as lyrics, are viewable only by purchasers.

The media data file 200 contains at least one media data chunk 206. Each media data chunk 206 includes a watermarked, compressed, and encrypted, audio image 208. Each of these images 208 is processed to provide different quality levels on playback, using different sampling rates and compression levels. Each image 208 encodes either the entire song file or a portion thereof. Use of a number of different images 208 of differing audio qualities allows the artist to a provide a single media data file 200 that can be previewed by users of different platforms and different audio playback capabilities. The data chunk also includes optional restrictions on such actions as playback and record to external devices or files.

First, the audio image 208 is watermarked by inserting additional data directly into the audio data stream prior to compression. A suitable watermark is implemented, for example, with Solana Technology of San Diego, Calif. Compression of the audio images 208 is preferably provided through the use of a high-quality compression algorithm. Each algorithm has a unique identifier to allow the system to operate with multiple compression formats. Compression may be provided, for example, using Dolby Laboratories, Inc.'s AC-3 compression algorithm.

The audio image 208 is encrypted with a symmetric media key, which is generated by the authoring tool 102, and is preferably a strong random number. The preferred encryption algorithms include DES and RC4. Encryption with a symmetric media key enables the audio image to be decrypted in real time as it is played back by the media player 116. Real time decryption reduces the amount of the audio image 208 that is available in a memory buffer in un-encrypted form at any given moment, and thereby reduces the probability of an attacker obtaining an illegitimate copy of the audio image.

As further explained below, the media key is separately encrypted with the public key of the content manager 112 while media data file 200 is stored in the master media file system 120. When the media data file 200 is to be delivered to a purchaser, the content manager's public key is removed, and the media key is then re-encrypted with the public key of the user's media player 116. This locks the media key, and hence the audio image 208 to the purchaser's media player 116.

For each audio image 208, there is provided space for encryption parameters 210, such as DES initialization vectors.

An index table 212 for each audio image 208 defines timing information for the image, to allow a media player 116 or delivery server 118 to randomly access any portion of the audio image during play back or streaming. The index table 212 may be implemented as an array of timing data and location information.

Clip and song information 214 defines the duration, starting time of a clip in song, and the duration of the song itself, along with fade-out and fade-in parameters, which are preferably the duration of each fade; the actual fade is then implemented by the media player 116. The clip audio data is not encrypted. This enables a prospective purchaser to preview a portion of the song.

A "For-Sale" flag 216 defines whether the media chunk 206 is for sale, or can only be previewed.

A timestamp 218, such as an SMPTE timestamp, is provided for editing the media data file 200 with professional audio editing tools.

A transaction ID 220 is added to each copy of the media data file 200 that is delivered to a purchaser. The transaction ID 220 is used to uniquely identify each copy of a media data file 200 that is purchased, and is added to the media data file 200 by the media player 116 upon receipt. The transaction ID preferably includes a media voucher ID, a timestamp of the time of delivery to the media player 116, a certificate serial number of the content manager 112 authorizing the delivery of the media data file 200, and the certificate of the media player 116 receiving the media data file 200.

Finally, the media data file 200 includes a table of contents 222 for the entire media data file 200. The table of contents 222 includes the location of each item of data in the media data file 200, and its type and subtype. Types include text, audio and graphics. Text subtypes include artist, title, lyrics, liner notes, and other text information. Graphic subtypes include cover art, and promotional art.

Media Voucher

The media voucher is an object that is used to control the purchase and preview of media data files 200. For each purchase or preview of a media data file 200, a new media voucher is created by the content manager 112 and provided to the media player 116 of the user. The media voucher is used by the media player 116 to identify both the specific media data file 200 to be acquired and the delivery server 118 to provide the information.

Figure 3:
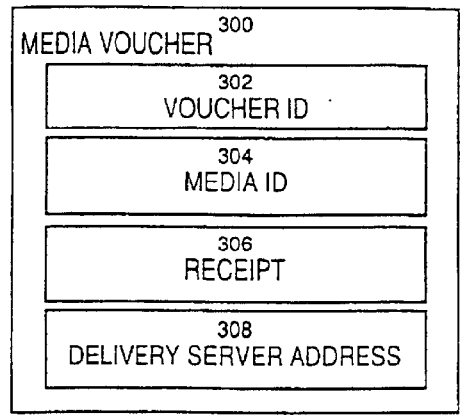
FIG. 3 is an illustration of a media voucher.

Referring now to FIG. 3, there is shown an embodiment of a media voucher. A media voucher 300 includes a unique voucher ID 302 which is generated by the content manager 112, and a media ID 304 that uniquely identifies the media data file 200. The voucher ID 302 limits the use of the media voucher 300 to a single purchase or preview transaction. A receipt 306 is a strong random number generated by the content manager 112 which is used to create a message authentication code (MAC) of the voucher ID and consumer certificate to bind the delivery of the media data to the purchase transaction. Preferably, the MAC is a keyed message authentication code as defined in Internet RCF 2104. A delivery server address 308 is the IP address and TCP port of a delivery server 118 that will provide the media data file 200 to the user's media player 116.

Passport

The passport is a data object that provides the security information particular to each user of the system. Each user is issued a passport by the media licensing center 110 during the registration process. The passport is stored on the user's computer and used during playback to decrypt the media key for each media data file 200 purchased by the user. Whereas encrypting the media key of a purchased media data file 200 with the public key of a user's media player 116 binds the media data file 200 to a specific user, the user's passport in turn enables the user to decrypt the file and play it back on her media player 116. Further, the passport includes confidential personal information of the user, and this deters the user from freely copying and distributing her passport to others.

Figure 4:
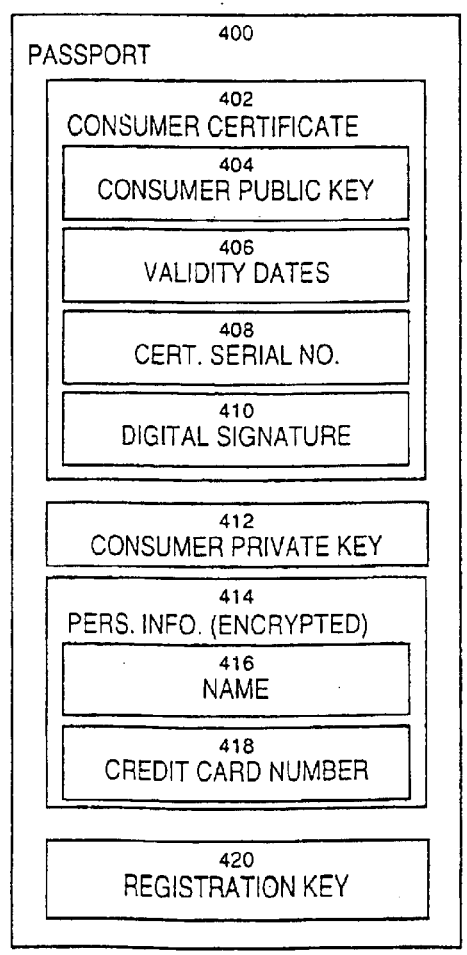
FIG. 4 is an illustration of a passport.

Referring to FIG. 4 there is shown an embodiment of a passport. Each passport includes a consumer certificate 402, a consumer private key 412, encrypted personal information 414, and a registration key 420. The consumer certificate 402 is used to authenticate the purchaser of a media data file 200, and to encrypt a purchased media data file 200. The certificate 402 is preferably in the ISO X.509 format, and issued by a trusted certificate authority, which in the preferred embodiment is the media licensing center 110. Each consumer certificate 402 in the ISO X.509 format includes a consumer public key 404, set of validity dates 406 defining the period during which the certificate is valid, a serial number 408, and a digital signature 410 of certificate authority.

The consumer private key 412, along with the public key 404 are generated by the media licensing center 110. Generation of the key pair by the media licensing center 110 is desirable to simplify recovery of the private key if the consumer loses it, to eliminate the need for the media player 116 to generate keys, and to simplify the registration protocol.

The passport 400 further includes personal and confidential information 414. This information preferably identifies the user, such as the user's name 416, and other similar information (e.g., address). In addition, confidential information, such as a credit card number 418 or the like. This personal and confidential information is displayed by the media player 116 during playback of the audio data of the media data file 200.

The consumer private key 412 and personal information 414 are encrypted with a user's registration key 420. This key is also generated by the media licensing center 110. The registration key 420 is stored in the passport 400 encrypted using a passphrase entered by the user during the registration process.

When a user purchases a media data file 200, the consumer certificate 402, which includes the public key 404, is provided to the content manager 112. The content manager 112 uses the public key 404 to encrypt the media key of the media data file 200. When the media player 116 receives the media data file 200 and encrypted media key it uses the registration key 420 to decrypt the private key 412 to decrypt the media key, which is then used to decrypt the audio image itself. It further uses the registration key 420 to decrypt the personal information 414 which is then displayed to the user. The user is required to enter his/her passphrase upon playback in order to decrypt the registration key 420.

Component Overview

Content Manager

The content manager 112 is the central transaction processor of the music distribution system 124, and is responsible for the overall management and administration of the "content" of the media data files, beginning with the receipt and storing of published media data files 200 from various authors, the management of preview and purchase transactions by individual users of media data files including the encryption of media data files 200 in a manner that allows only a particular user to access the media for playback, and the reporting to rights agents of purchases and other uses of media data for proper compensation of authors of fees and royalties from such uses. The content manager 112 stores details of each transaction in the transactions database 130.

Delivery Server

The delivery server(s) 118 is the mechanism by which the media data files 200 are delivered to users via the media players 116 in the client systems 126. More particularly, a delivery server 118 is responsible for receiving requests from a media player 116 to preview or purchase a media data file 200 containing audio data, to route such requests to the content manager 112 for authentication and encryption, and to deliver the requested media data file 200 or portion thereof as a preview by real time streaming of the content of the audio data for immediate playback at the media player 116, or as a purchase by securely downloading the media data file to the user's client system 126 for subsequent playback by the media player 116 or recording to CD for playback on conventional CD players.

Media Player

Figure 14:
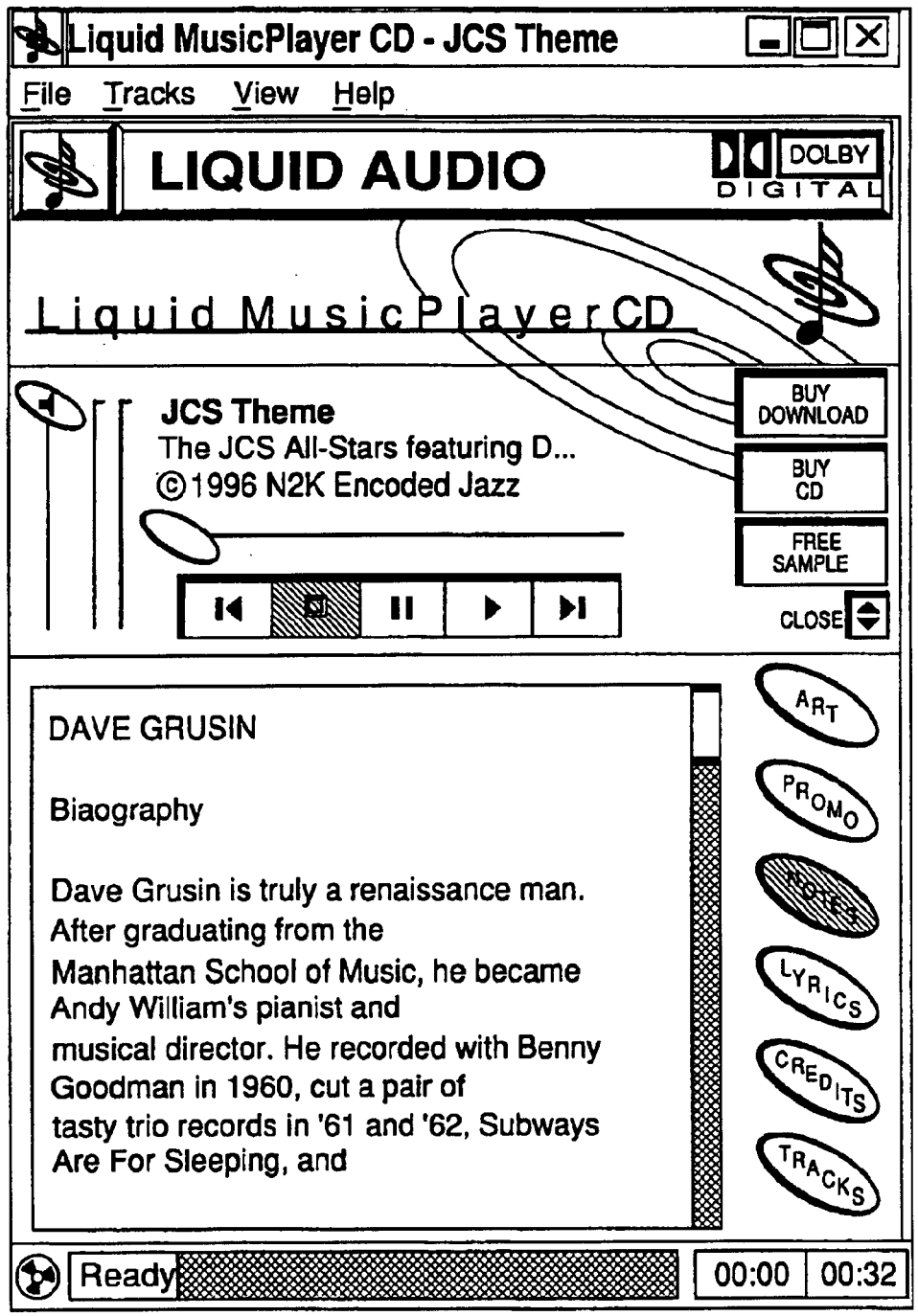
FIG. 14 is an illustration of one embodiment of the user interface of the media player.

The media player 116 is the mechanism by which the consumer plays back purchased or previewed audio data, and by which the consumer digitally records purchased media data files to a further external memory, such as a CD-Recordable, CD-RW, Mini-Disc, flash memory, or the like. The media player 116 provides user interface controls for viewing lists of purchased and stored media data files 200, viewing cover and promotional art and graphics, reading lyrics and other liner information, organizing play lists and tracklists, and other music database management features. FIG. 14 illustrates an embodiment of the user interface of the media player 116.

The media player 116 is also responsible for storing and managing a user's passport 400, and accessing the passport data to decrypt audio images in real time as the audio image is being played back.

Media Licensing Center

The media licensing center 110 is a licensing and certificate authority. New users of the system who wish to purchase data from the music distribution center 124 must first register with the media licensing center 110 to obtain a consumer certificate 402, including the public-private key pair. The media licensing center 110 is responsible for generating these public-private key pairs on behalf of the media player 116 for encrypting the media data files 200 and other information to be received by the media players 116 so that only a particular user's media player 116 can decrypt and playback the audio image data 208 included in a media data file 200 purchased by that user. The media licensing center 110 is further responsible for authenticating new users as they register, and for generating certificates that are attached to various media data files by the various other components of the music distribution center 124 as they are moved through the system to authenticate these components.

The media licensing center 110 further is responsible for generating the user passports 400.

Among the certificates issued by the media licensing center 110, are certificates to the content manager 112. These certificates are designed to have relatively short validity periods, preferably on the order of 1 to 2 weeks. This short validity period is used to ensure that "pirate" sites can be shut down in a timely manner. Accordingly, the media licensing center 110 is further responsible for updating the certificate of the content manager 112 if it expires.

Finally, the media licensing center 110 provides for generating rights reports of the usage of media data files, and for communicating such rights reports to the rights agents 108.

The foregoing elements are the basic components for secure distribution of music data given a collection of music and other media. In order to obtain media data files 200 for distribution, the authoring tools 102 are used by individual artists to create the audio data and associated media data in the media data files 200 to be delivered over the network to the content manager 112 for storage in the master media data file system 120. Information descriptive of the master media data files is extracted by the content manager 112 from each of the master media data files and stored in the media information database 106.

Distribution Hub

While an artist can upload a master media file directly to the content manager 112 from the authoring tool 102, the artist may instead forward a master media file to a distribution hub 104 for augmentation. A distribution hub may be a computer system managed by a recording agency or record label, or other agency, which manages or otherwise participates with the artist in the creation and promotion of the artist's works. The distribution hub 104 may be used to add agent codes which identify the rights agent responsible for receiving purchase and usage information from the content manager 112, along with agency identification codes which identify the artist and the media data created by the artist to the agency. For example, agency codes may by the product code or SKU code used by the agency to track each artists' works.

Merchant Server & Payment Processor

A merchant server 132 is an external system which acts as authorized electronic retailer 15 of music and media over the network. The payment processing systems 134 are conventional payment authorization systems, such as credit card authorization systems or debit card payment authorization systems.

Operational Overview

The system 100 of the present invention and music distribution center 124 provide a number of processes and workflows to support the secure distribution of music and related media. These workflows include:

Publishing: this is the process of transferring master media data files from the authoring tools 102 to the content manager 112. Once imported and catalogued by the content manager 112 into the media information database 106 the master media files are generally available for preview and purchasing by individual users.

Registration: each entity in the system registers with the media licensing center 110 to obtain a certificate that is used for authentication of identity by the various entities of transferred data. In particular, a user registers to obtain a consumer certificate that is used by the content manager 112 to authenticate the identity of a purchaser of a media data file. Authors also register to obtain an author's certificate that is used by the content manager 112 to authenticate the author when the author uploads a master media data file for inclusion in the master media file system 120. The content manager 112 registers with the media licensing center 110 to obtain a certificate that enables it to distribute media data files themselves.

Preview: this process is supported by the delivery servers 118 and media players 116 to provide a real time streaming of audio data and display of related media data at a media player 116. The preview enables the user to decide whether or not to purchase the entirety of the song for permanent storage on their hard disk and subsequent recording to a CD-R or other external device.

Purchase: this process is the transaction of purchasing a media data file from the content manager 112 and its delivery by a delivery server 118 to a media player 116.

Rights Reporting: The rights reporting process provides a tamper-proof mechanism to securely track electronic music distribution. This process securely uploads usage (purchases, previews and so forth) of media from the content manager 112 to various rights agents 108. This uploaded information describes the number of times various media data files have been used to allow for accurate reporting of such usage for the purpose of royalty payments and other fees to the artists, owners, record labels and so forth. These mechanisms allow music industry participants to protect their copyrights and could be used by rights reporting agencies to bill distributors for royalties associated with the volume of electronic distribution of the media data files.

Publishing

Figure 5:
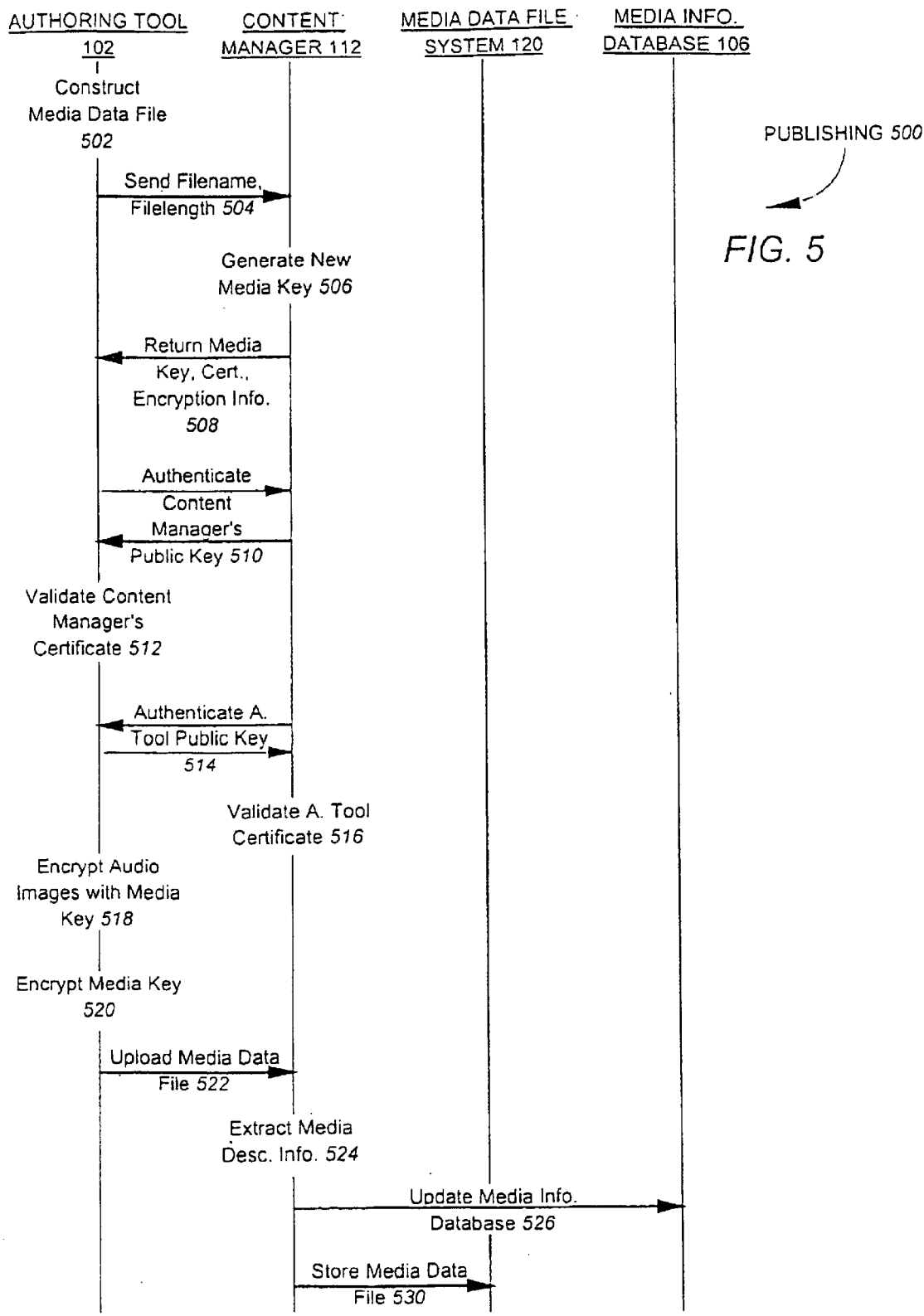
FIG. 5 is an event trace of the publishing process.

Publishing is the process of distributing media data files 200 from their respective authors to the content manager 112 for inclusion in the music distribution center 124. Referring now to FIG. 5 there is shown an event trace of the publishing process 500. First, the artist constructs 502 the media data file 200 in the authoring tool 102. Generally, individual authors will record various musical works into a digital format, and obtain or design cover and promotional art to be incorporated with the music into the media data file 200. The artist then uses the authoring tool 102 to perform any desired digital signal processing, and editing on the digitally recorded audio data. The authoring tools also provide for compression of the audio images, watermarking, and encryption. The authoring tool 102 is also used by the artist to enter the media descriptive data 204, such as the artist's name, song title, lyrics, and the like, as previously described.

An artist can include in a media data file 200 a number of different audio images 208, each having different quality levels, in terms of bandwidth, as determined by compression level and sampling rate.

The media keys generated by the authoring tool 102 are preferably cryptographically secure random numbers. They are used to encrypt the audio images 208.

Following construction of a media data file 200 including encryption of the audio images 208, the authoring tool 102 establishes 504 a connection with the content manager 112, and 15 transmits the filename and file length of the media data file 200 to be uploaded. The content manager 112 responds 508 with its own certificate (which includes its public key).

The authoring tool 102 and the content manager 112 then cross-authenticate each other. The authoring tool 102 authenticates 510 the content manager 112 as follows. The authoring tool 102 receives a timestamp and a hash of the timestamp, the authoring tool username and password all encrypted with the content manager's private key. The authoring tool re-creates the hash, decrypts the hash sent by the content manager and compares the two. If these items match, this verifies that the content manager 112 has the matching private key, and authenticates the content manager 112 to the authoring tool 102. The authoring tool 102 further validates 512 that the content manager's certificate is signed by the issuing certificate authority, which in this case is the media licensing center 110.

The content manager 112 then authenticates 514 the authoring tool 102 in a similar manner, receiving the certificate of the authoring tool 102 and a hash of some information available to the content manager encrypted in the authoring tool's private key. The content manager 112 also validates 516 the certificate of the authoring tool 102. Other authentication protocols may also be used between the authoring tool 102 and the content manager 112.

Once the cross-authentication is complete, the authoring tool 102 encrypts 518 the audio images 208 with the media key and encrypts 520 the media key with the public key of the content manager 112 using the specified encryption algorithm. Now only the content manager 112 can decrypt the media key, and hence decrypt the audio images 208. The authoring tool 102 finally transmits 522 the complete media data file 200 to the content manager 112.

The content manager 112 receives the media data file 200 and extracts 524 the media descriptive data from it, and updates 526 the media information database 106 with a new entry for the media data file 200. The content manager 112 also stores 530 the media data file 200 in the master media data file system 120. If the 'For sale' flag 216 of the new media data file 200 is set, then the media data file 200 is ready for purchase by a consumer. The security of the media data files 200 in the master media data file system 120 is provided by the persistent encryption of the individual media keys for each media data file 200 with the public key of the content manager 112. Additional security for the private key of the content manager 112 may be provided by tamper-proof hardware, for example, GTE Internetworking/ BBN's SafeKeyper Signer product.

Registration

Figure 6:
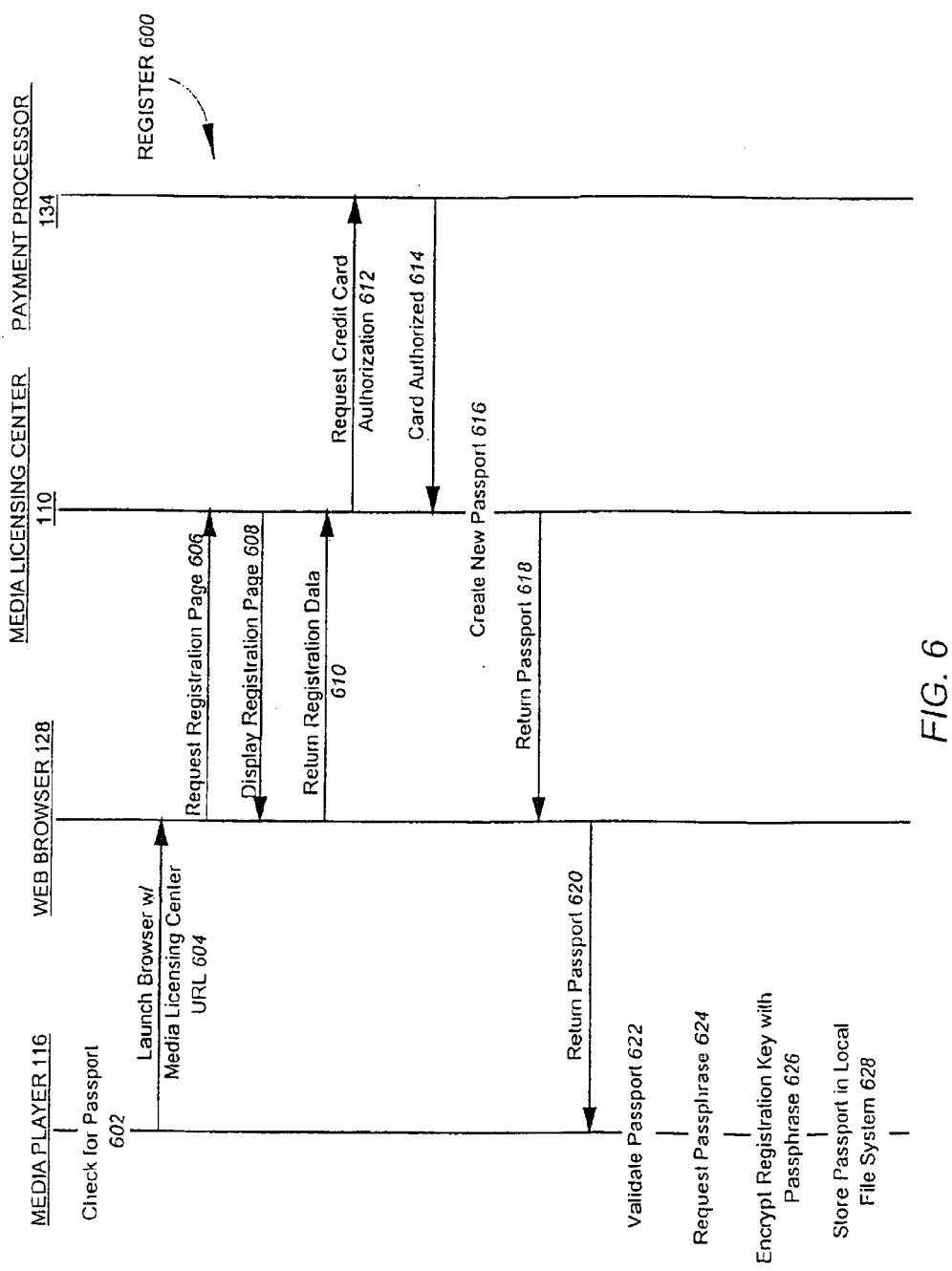
FIG. 6 is an event trace of the registration process.

Registration is the process of the purchaser establishing a trusted identity to the music distribution center, for engaging in later transactions. Referring now to FIG. 6 there is shown an event trace of the process of registration 600 by user.

When the media player 116 starts up, it checks 602 for the existence of the user's passport 400 containing the user's private key. If the passport 400 does not exist, the media player 116 will launch 604 the Web browser 128, providing it a URL to a registration page of the media licensing center 110. The Web browser 128 requests 606 the registration page, which is returned and displayed 608 by the Web browser 128.

The registration page is a form which collects the personal information necessary to register the user. This information includes full name, billing address, telephone number, email address, credit card number and expiration date. Other personal information that may be collected includes a driver's license number, and the like. The user enters this data into the Web browser 128, and presses, for example, a Register button, which invokes a CGI script on the server 122 to return 610 the registration data to the media licensing center 110. This information is preferably transmitted over a secure communication link, such as Netscape Communications, Inc.'s Secure Sockets Layer v. 3.

The media licensing center 110 extracts the credit card information and verifies it by requesting 612 a credit card authorization from a payment processor 134. The credit authorization is returned 614 to the media licensing center 110 if approved. If the credit card is not approved, the media licensing center 110 returns a page to the Web browser 128 with an error message, and request for a different credit card number.

Once the credit card is authorized, the media licensing center 110 generates 616 a new passport 400 for the user's media player 116. The media licensing center 110 generates a public/private key pair to be the consumer's public key 404 and private key 412. The media licensing center 110 formats the passport 400 as an ASCII file, including:

(a) a certificate chain, which includes a hierarchy of certificates, serially signed. The certificate chain begins with the certificate of the media licensing center 110 certificate authority and terminates with the consumer certificate 402.

(b) a consumer certificate 402, signed by the media licensing center 110, including the generated public key 404.

(c) the consumer's private key 412, encrypted with a strong, randomly generated registration key 420.

(d) the consumer personal information 414, also encrypted with the registration key.

(e) the registration key 420 in cleartext.

The consumer's private key 412 and personal information 414 is also digitally signed by the media licensing center's private key to prevent tampering.

The passport 400 is then returned 618 to the Web browser 128 over the secure connection, with a predefined MIME type that identifies it to the Web browser 128 as being data for the media player 116. The Web browser 128 passes 620 the passport 400 to the media player 116.

The media player 116 then validates 622 the passport 400 for authentication and tamper detection by authenticating the certificate chain. The certificate chain is authenticated by starting with a root certificate of the media licensing center 110 that is stored in the media player 116, using the public key of the root certificate to decrypt a hash of the certificate and compare that decrypted hash with a newly generated hash. If the hashes are identical, the next certificate is authenticated in a same manner.

Once the passport is validated, the media player 116 queries the user to obtain 624 a passphrase for the registration key. The media player 116 then encrypts 626 the registration key 420 with the user-supplied passphrase. Registration encryption is preferably implemented with RSA Data Security, Inc.'s BSAFE PBE (MD5+DES) algorithm.

The passport is then stored 628 to the local file system of the client computer 126. The passport 400 may be stored in a default location, or a user's specified one. The file format for the passport 400 is operating system independent to provide for portability of the passport 400 between Microsoft Corp.'s Windows operating system and Apple Computer Inc.'s MacOS.

The user is now authorized to purchase and preview music from the system.

In a preferred implementation, the passphrase while in memory and the decrypted private key should be safe from ActiveX, JavaScript, and similar forms of attack applets that could illegitimately copy these keys and return them to an attacker. In addition, while the media player 116 is active, the media key should remain encrypted as much as possible.

On losing the registration key 420 or the passphrase that encrypts it, the registration key 420 can be sent again from the media licensing center 110 to the media player 116 via the Web browser's SSL connection to a Web server on the media licensing center 110.

The media licensing center 110 maintains a persistent database of all consumer certificates issued, including the personal information 414 associated with each certificate.

Preview

Figure 7:
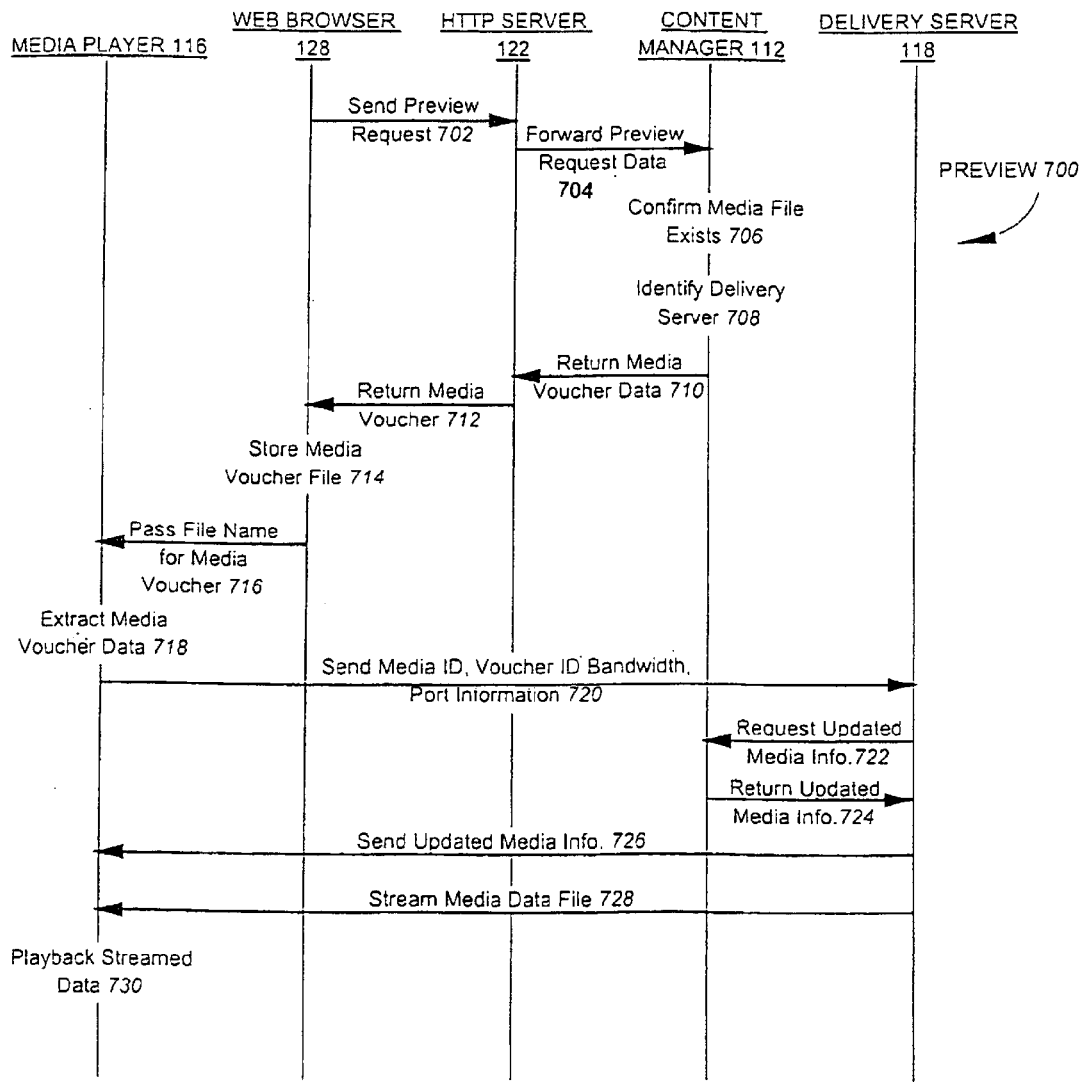
FIG. 7 is an event trace of the preview process.

Referring now to FIG. 7 there is shown an event trace of the process 700 of previewing a media data file 200 prior to purchase.

Figure 8:
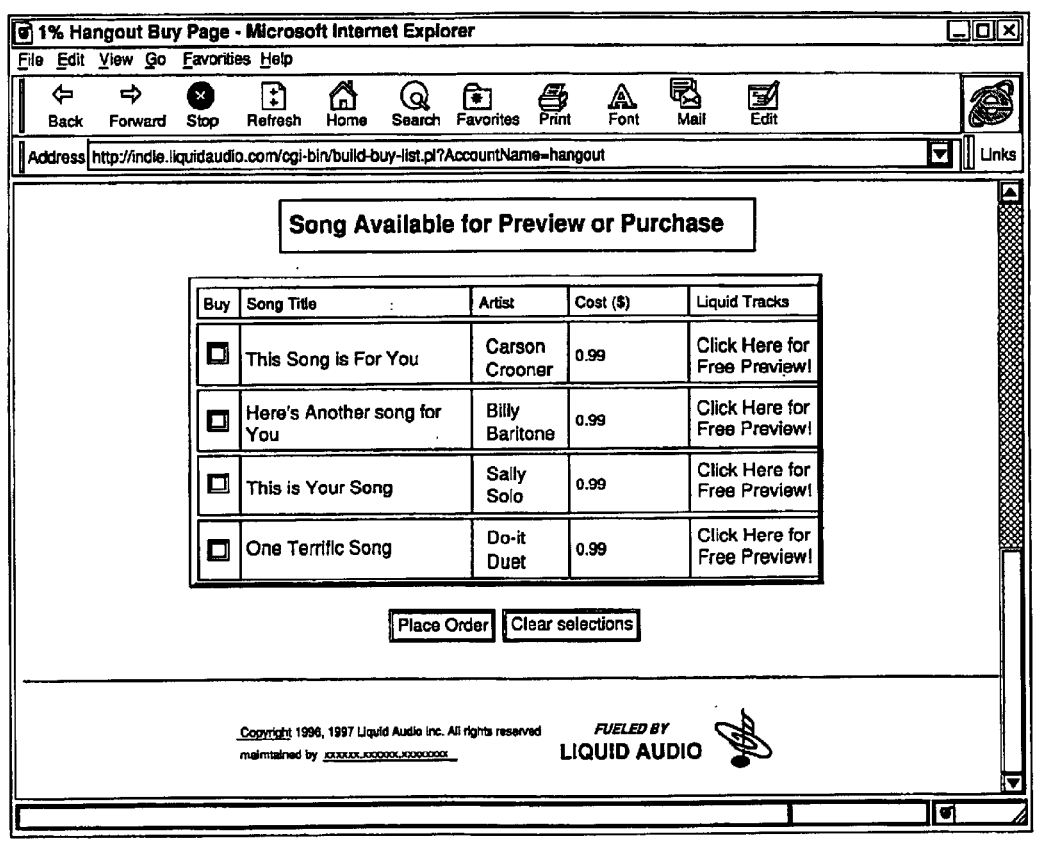
FIG. 8 is an illustration of a Web page for selecting a preview during the preview process.

Previewing begins with the user viewing a Web page in the Web browser 128 that has a link to a preview of a desired media data file 200. FIG. 8 illustrates an exemplary Web page for selecting a preview. The link is to the HTTP server 122, and when clicked, the Web browser 128 invokes 702 the HTTP server 122 with a request for a preview of a media data file 200. The URL for the link encodes the media ID and type of request, whether for a clip or the entire song.

The HTTP server 122 receives the preview request for preview, and invokes 704 the content manager 112 via an insecure TCP connection, passing in the media ID and request type, here a preview type request.

The content manager 112 receives the preview request, and validates 706 that media data file 200 specified by the media ID exists. In a preferred implementation this is done by accessing first a cache of media IDs of frequently accessed songs. If the requested media ID is not present in the cache, the content manager 112 then checks the master media file system 120 for requested media data file 200. If the media data file 200 is not present here, the content manager 112 returns an error.

Assuming the content manager 112 confirms the existence of the requested media data file 200, it then determines 708 whether a delivery server 118 is available to handle request to preview the file.

In a preferred embodiment, each delivery server 118 is licensed and configured by the system provider to have a limited number of active streams of data being delivered at any one time. The content manager 112 maintains a list of the delivery servers 118 it operates with, and the number of active streams and total streams for each delivery server 118. Each delivery server 118 registers with a content manager 112, providing its network address. The content manager 112 configures each registered delivery server 118 with the number of stream allocated to the delivery server 118, the base UDP port to be used for the streams, and a port number for accepting streaming requests on.

When a delivery server 118 allocates a stream then, it updates the content manager 112 with this information. Accordingly, to determine availability of a delivery server 118, the content manager checks this list for the first available delivery server 118 which does not have all streams allocated. If no streams are available, then the content manager 112 returns a message to the Web browser 128 indicating that the preview cannot be delivered at the present time.

Assuming the content manager 112 identifies an available delivery server 118, the content manager 112 generates and returns 710 to the HTTP server 199 a media voucher 300. This includes the network address 308 of the delivery server 118 and port number, voucher ID 302, and media ID 304.

The HTTP server 122 generates and returns 712 to the Web browser 128 an HTTP response embedding the media voucher data. A MIME type is defined that causes the Web browser 128 to invoke the media player 116 with the response data.

The Web browser 128 receives the HTTP response and stores 714 the data of the media voucher 300 in a local file. The Web browser 128 then passes 716 the file name of this file to the media player 116.

The media player 116 receives the file name of the media voucher 300, reads the file, extracts 718 from the media voucher 300 the delivery server address 308 and port, voucher ID 302 and media ID 304. The media player 116 then sets up communication channel with the specified delivery server II 8 and passes 720 in the voucher ID 302 and the media ID and bandwidth requirement, which is an estimate of the media player's Internet connection bandwidth. The media player 116 also provides port information identifying which ports it is to receive the streamed audio data from the delivery server 118.

The delivery server 118 receives the voucher ID and media ID and contacts 722 the content manager 112 to obtain the media information from the media information database 106. The delivery server 118 specifies to the content manager 112 the media ID for the media data file 200, and the number of, and specific types of information to be retrieved from the media descriptive data 204. This step is to obtain the most current information about the media data file 200, in case there have been any updates, for example to the price information or other data. The content manager 112 responds 724 with media information of each requested type.

The delivery server 118 then transmits 726 the media information to the media player 116. This information informs the media player 116 of the duration of the clip or song, data size of the encoded audio to be delivered, starting and ending times of the clip, fade-in and fade-out durations, and bandwidth.

The delivery server 118 then streams 728 the media data file 200 to the media player 116. To stream the media data file 200, the delivery server 118 notifies the content manager 112 that it is allocating one of its streams for a particular request by providing to the content manager 112 the voucher ID 302 of the media voucher 300, the network address of the media player 116 to receive the stream, the bandwidth requested by the media player 116, and the media ID of the requested media data file 200.

The media player 116 receives the streamed media data file 200 and plays 730 the audio image according to the provided media information parameters. At any time, the user can instruct the media player 116 to stop the stream and download any free data over the same connection. When streaming is completed, the delivery server 118 notifies the content manager 112 to release the stream, indicating the voucher ID 302, the status of the stream, the duration of the song that was played by the consumer, and which audio image 208, if any, was downloaded to the media player 116.

The user interface of the media player 116 supports controls to control the streaming of the audio, including fast forward, rewind, pause, and stop controls. To implement these controls, the media player 116 and delivery server 118 use a time-based transport protocol. The media player 116 sends transport instructions to the delivery server 118 that specify a time offset within an audio image at which to begin playing. The delivery server 118 then either advances or rewinds to the specified time. Fast forward user controls cause fixed increments of time advance, and rewind controls cause fixed decrements of time. Negative time values are used to indicate stopping and resuming play.

Purchase

Figure 9A:
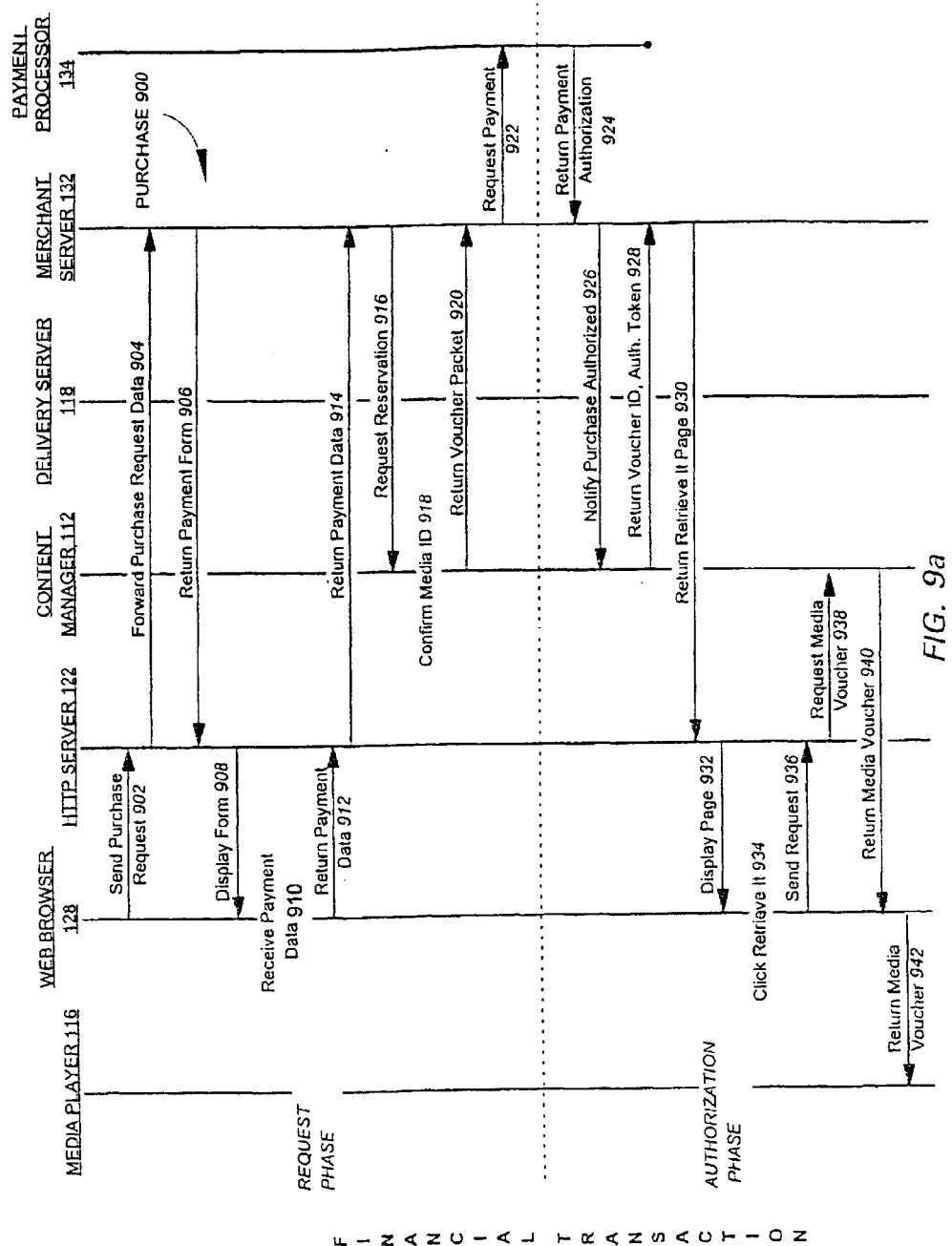
FIGS. 9a, 9b are an event trace of the purchase process.
Figure 9B:
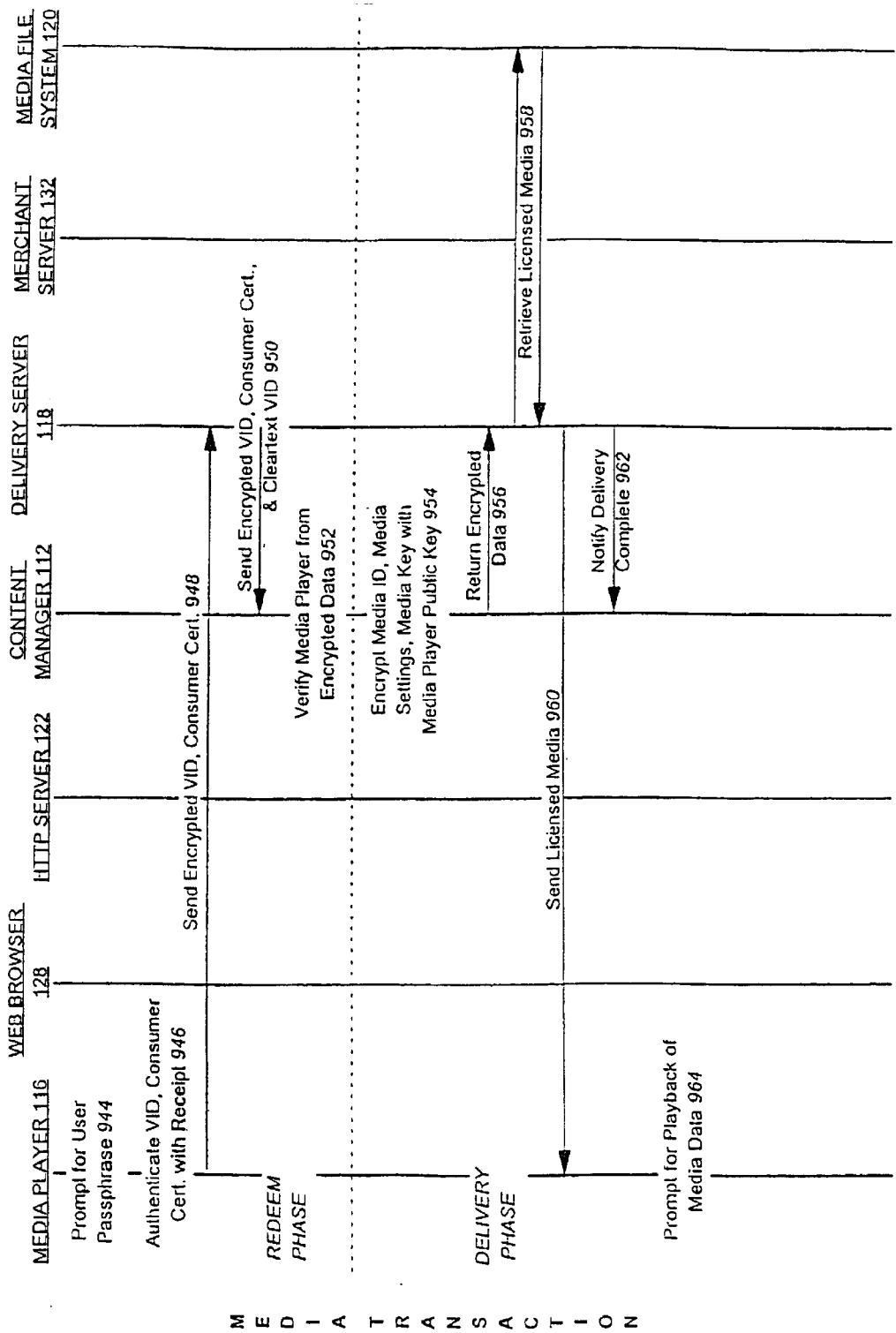

Referring now to FIGS. 9a and 9b there is shown an event trace of the process 900 of purchasing a media data file 200 for persistent storage and playback by a user's media player 116.

First, the user will be viewing in the Web browser 128 some form of menu, catalogue, index or other listing of music and media available for purchase, and may be similar in form to the preview listing of FIG. 8. From the user's Web browser 128 a purchase request for a specific song is sent 902 to the HTTP server 122, for example by the user clicking on a "Buy It" button. The button generates a URL including the media ID of the song to be purchased. For example, an invocation of the HTTP server 122 may look like:

https://web-server-addr/cgi-bin/purchase?mid=MID where web-server-addr is the hostname or IP address and TCP port of the HTTP/SSL server and MID is the media ID.

The HTTP server 122 forwards 904 the purchase request data to a merchant server 132 to initiate authorization for payment for the requested media data file 200. A preferred implementation uses a secure connection to transfer this data.

Payment information is preferably collected at this time. The merchant server 132 generates a payment request form and transmits 906 this form back to the HTTP server 122 for display 908 at the Web browser 128.

The user completes 910 the form, which preferably requests the user's name, credit card number, and expiration date. For example, an invocation of the HTTP server 122 may look like:

https://web-server-addr/cgi-bin/ccinfo?cc=CCNO&exp= DATE&mid=MID. where CCNO is a credit card number, and DATE is the expiration date of the credit card.

This data are then transmitted back 912 to the HTTP server 122 which passes 914 it to the merchant server 132. If payment information is not collected at this stage then it must be collected after a reservation has been generated (see below).

The merchant server 132 requests 916 a reservation for the requested media data file 200 from the content manager 112, passing in the media ID of the requested media data file

200, a requested quality level (bit rate and number of channels in the audio image). The reservation verifies that the requested song at the specified quality level actually exists in the master media files 120 and is available for purchase.

The content manager 112 looks up the received media ID in the media information database 106 to confirm 918 that the requested song exists and is available for purchase. If the media data file 200 identified by the media ID exists in the database, then the content manager 112 returns 920 to the merchant server 132 a voucher packet. Otherwise, the content manager 112 returns a message indicating the media ID does not correspond to a known media data file 200 or that the corresponding file is not available for sale; this information is communicated back to the Web browser 128. Preferably, the content manager 112 also checks whether the IP address of the merchant server 132 is known by comparing it against an previously trusted IP address of the merchant server 132. This step ensures that a known merchant server 132 is indeed sending the reservation request.

The voucher packet includes a voucher ID generated by the content manager 112 to track the reservation, a timestamp marking the start of the reservation, an expiration lifetime defining in seconds when the reservation becomes invalid after the timestamp, an authorization token that marks reservation as authorized, or as unauthorized in order to remove the reservation. Finally, the voucher packet includes a receipt token, which is returned in the media voucher to the media player 116 for initiating download of the requested media data file 200 from a delivery server 118. The authorization token is a secret token between the content manager 112 and the merchant server 132 and is not revealed to the user. This token and the receipt token are preferably strong random numbers.

The content manager 112 updates the transaction database 130 to include a new entry with the data from the voucher packet. This data will be used subsequently to authenticate a download request from the media player 116 against a validated purchase. More particularly, the content manager 112 maintains three sets of data regarding reserved and available for retrieval media files:

i) Pending purchases. These are media data files 200 that are reserved but not yet authorized for delivery;

ii) Purchased and not delivered. These are media data files 200 that have been authorized for delivery and for which a receipt token has been issued but not yet redeemed; and iii) Purchased and delivered. These are media data files 200 for which a receipt token has been issued, validated, and redeemed by delivery of the file to the requesting media player 116.

When a voucher packet is issued for a reservation, it is added to the list of pending purchases.

In an alternative embodiment, an electronic wallet is used to provide the payment data. In this embodiment, the merchant server 132 generates a Web page with a "Wallet" button and a "Retrieve It" button. When the user clicks on the wallet button, the merchant server 132 returns an invoice with a "wallet" MIME type, indicating the amount of the purchase. The Web browser 128 launches a wallet application that is specific to the wallet MIME type. This wallet application recognizes the invoice information, and displays to the user a set of selections of different payment forms available to the user, such as electronic cash, check or specific credit card. The user selects one of these payment forms. The wallet application then connects to the merchant server 132 (using a network protocol defined by the wallet application manufacturer), and delivers the required payment information. The consumer clicks a 'Pay' button to consummate the transaction.

In either embodiment, the merchant server 132 connects to a payment processor gateway 134 to request payment 922 by verifying the availability of funds and receiving 924 payment authorization.

Once the merchant server 132 has received payment authorization, it notifies the content manager 112 that the user has purchased the media associated with the voucher ID. This is done by providing 926 the voucher ID and authorization token previously sent to the merchant server 132, and a flag indicating the new state of the reservation as authorized for delivery. The content manager 112 updates the transaction database 130 to reflect that the voucher packet for this voucher ID has been authorized for purchase and download. This notification authorizes the content manager 112 to enable the requested media data file 200 for delivery. The content manager 112 returns 928 the voucher ID and an updated authorization token, which is needed in case the reservation needs modification.

After the merchant server 132 has authorized a purchase, it logs this information to an internal purchase database. Purchase logging has two purposes. First, it enables the merchant to keep track of what media has been sold, and second, allows the merchant to accurately report to a rights agent 108 for copyright notification and billing purposes. Two logs are preferably used: a merchant log and an audit log. The merchant log is plaintext, where as the audit log is stored encrypted. The audit log is uploaded periodically to the media licensing center 110. The protocol for creating and validating the audit log is described under RIGHTS REPORTING below.

In the wallet payment embodiment, the merchant server 132 returns a payment receipt to the wallet application.

In the non-wallet case, the merchant server 132 creates and sends 930 a Web page, via the secure HTTP connection established originally, to the Web browser 128 with a 'Retrieve It' link for display 932. The Retrieve It link is established with the URL of the delivery server 118 to provide the requested media data file 200. An example of this data is:

https://web-server-addr/cgi-bin/lavs?vid=VVV&receipt=RRR where VVV is the voucher ID and RRR is the receipt token.

When a user clicks 934 on this link in the Web browser 128, another secure HTTP connection is setup by the Web browser 128 with the HTTP server 122, and the voucher ID and receipt token returned 936 to a CGI script that contacts 938 the content manager 112 to request the media voucher 300 containing the voucher ID, receipt token and delivery server network address and port number. The content manager 112 generates the media voucher 300 and returns 940 it to the Web browser 128 via the secure HTTP connection.

The media voucher 300 is encoded with a MIME type that identifies it as data for the media player 116. Accordingly, the Web browser 128 passes 942 the media voucher 300 to the media player 116.

The media player 116 prompts 944 the user to enter the passphrase associated with the private key registered to the media player 116. Depending on a user-settable preference, the prompt will appear once per session or every time. Security is provided at this step by the passphrase protection of the user's private key 412 in their passport 400.

The media player 116 uses the receipt token (the shared secret with the content manager 112) to authenticate 946 the voucher ID 302 and the consumer certificate 402. The media player 116 establishes an unsecure TCP connection to the delivery server 118 using the address and port specified in the media voucher 300. The media player creates a message containing a keyed MAC of the voucher ID 302 using the receipt token as the key. This message is signed and sent 948 to the delivery server 118 to start the download procedure. The delivery server 118 sends 950 the encrypted data and the cleartext voucher ID 302 to the content manager 112 for verification.

The content manager 112 maps the voucher ID 302 to the receipt token in the transaction database 130. The content manager 112 then uses the receipt token to verify 952 the MAC encoded voucher ID and other data.

If the voucher ID is verified, the content manager 112 encrypts 954 the song's media key with the public key of the media player 116. In this manner, the media becomes specifically and individually licensed to the consumer; the media data file 200 is now referred to as the licensed media. Security in this step of the transaction is provided by the fact that media player 116 must prove that it has both the public/private key pair issued by the media licensing center 110 and the receipt sent as part of the purchase transaction. The certificate chain is validated upon receipt from the player.

The content manager 112 then returns 956 the encrypted media key, along with audio quality information (bit rate and number of channels), the public key algorithm used with the media key itself and encryption parameters, the authorization token, media ID, the voucher ID, and the content manager's certificate serial number, and the media player's certificate number to the delivery server 118.

The delivery server 118 retrieves 958 the licensed media from the master media data file system 120 according to the media ID included in the media voucher 300, and sends 960 it to the media player 116 using a secure protocol, such as SSL, to ensure that no one else can determine which music is being downloaded by the media player 116. The downloaded media data is hashed by the media player 116 and sent back to the delivery server 118 to verify complete receipt. In a preferred embodiment, the delivery service 118 limits the rate of the data transfer to the media player 116 to conserve network resources.

Once delivery is complete, the delivery server 118 notifies 962 the content manager 112, indicating the voucher ID, media ID, receipt token, time duration of the download, and the authorization token. The content manager 112 updates its transaction database 130 to reflect that the media data file has been delivered.

When a received media data file 200 is to be played back 964 (either immediately or at a later time), the consumer's passphrase is entered. The media player 116 extracts the encrypted registration key 420 from the passport 400 and decrypts it with the passphrase. The media player 116 then extracts the encrypted private key 412 from the passport 400 and decrypts it with the registration key 420. The media player 116 then decrypts the media key with the consumer's private key 412. Finally, the media key is then used to decrypt the audio image 208 in real-time as the media is played.

As the audio image 208 is being played back, the consumer's personal information 414 from the passport 400, including their confidential information 418, is preferably displayed in the user interface of the media player 1116. The display of this information is a strong deterrent to the user to transferring an illegitimate copy of the media data file 200 to another user. In addition, because the media player 116 provided the consumer certificate 402 as part of the delivery protocol, the certificate serial number embedded in the media data file along with the voucher ID 302. This enables either the merchant owning the merchant server 132 which sold the music, or the media licensing center 110 to lookup the consumer's personal information and identify this person as the source of an illegitimate copy of the media data file 200.

Rights Reporting

When the content manager 112 is started, it communicates with the media licensing center 110 to initiate a secure tamper-resistant log to be used for rights reporting information. They negotiate a shared secret, a cryptographically strong random number, that will be used to encrypt and validate the log. The secret is stored only on the media licensing center 110 so the log created by the content manager 112 can only be verified once it is delivered to the media licensing center 110.

A secure log entry is created for every media data file that is sold. When an entry is made the secret is used as a key for encryption and for creating a keyed MAC and is then hashed with a string to create the key used for the next log entry. The keyed MAC covers the encrypted log entry along with a "running hash" that is updated by hashing the current encrypted data into the old hash value. Since the encryption key and MAC key are different for each log entry and are created via a one-way hashing function, the only way to validate the log or decrypt an entry is to start with the shared secret which is stored only on the media licensing center 110. This makes the log significantly secure against tampering once it is created. Also, since the hash on each entry covers all previous entries it is not possible to remove entries in the middle of the log without detection when the log is validated at the media licensing center 110.

This logging protocol is used for making entries each time a media data file is completely downloaded by the media player 116. The log entry includes a timestamp, the track title, the artist name, the track authors, the song length, the sale price, the certificate ID from the media player 116, the voucher ID, the media data file name and a descriptor for which audio image was downloaded. The logs are uploaded to the media licensing center 110 on a periodic basis and validated off-line by a batch process. Once validated, the purchase information can be processed (e.g., totaled by artist, track, and the like) to determine proper royalty or other payments based on sales and previews.

Component Architecture

Content Manager

Figure 10:
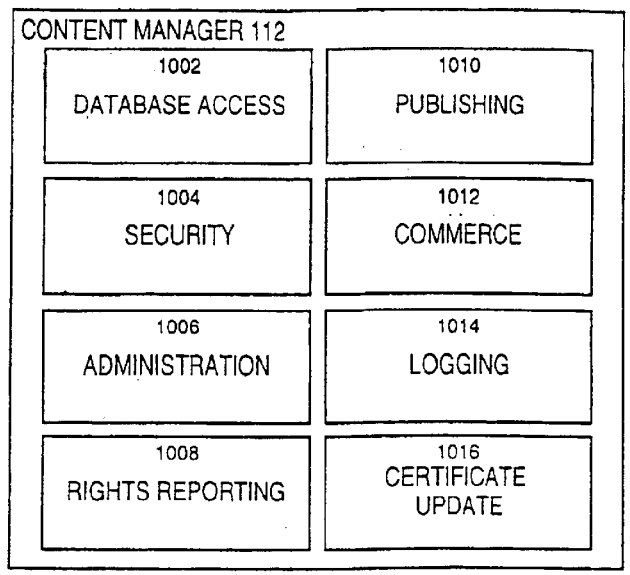
FIG. 10 is an illustration of the content manager.

Referring now to FIG. 10, there is shown an illustration of the software modules of a preferred embodiment of a content manager 112. The content manager 112 includes a database access module 1002, a security module 1004, an administration module 1006, a rights reporting module 1008, a publishing module 1010, a commerce module 1012, a logging module 1014, and a certificate update module 1016.

Database access module 1002: This module manages all requests for data from the master media file 120 and media information database 106. The various other modules interface with this module to retrieve, update, create, or delete media data file 200, media descriptive data 204. The database module 1002 receives data requests typically as name, value pair, and translates these requests to SQL requests on the underlying databases.

Publishing Module 1010: This module provides the interface for both external uploading from the authoring tool 102 of the media data files 200, and importing media data files 200 from the local file system of the computer hosting the content manager 112.

More particularly, the publishing module 1010 exports the following functions:

Upload File: This message is sent by the authoring tool 102 to initiate the uploading of a media data file 200. The message includes the length of the media data file 200 to be uploaded, flags indicating whether the file is to be created, overwrite an existing file, and it is a secure upload, and a file name of the file. If the file is to be securely uploaded, the publishing module 1010 obtains from the security module 1004 the content manager's public key to encrypt the media key for the audio image, the content manager's certificate, and the algorithm used to encrypt the public key itself. This information is passed back (508, FIG. 5) to the authoring tool 102 during the publishing process to authenticate the content manager 112.

Upload Data: This message is sent by the authoring tool 102 to the content manager 112 and contains the data being uploaded (522, FIG. 5), as described in the previous message.

Upload Abort: This message ends an in-progress upload.

Upload Space: This message requests the amount of free space available on the content manager 112 for new uploads. The publishing module 1010 responds with a total number of kilobytes allotted for uploading, and a number of free kilobytes remaining.

Import file: This message instructs the publishing module 1010 to import a file from the local file system.

List Project: This message obtains a list of the file or subprojects in a local directory; the message data specifies the pathname of the directory. The publishing module 1010 responds with the number of entries for project, the filename of each entry and a flag for each entry indicating whether it is a file or a subproject.

File Info: This message requests detailed information for a file, specified by pathname. The publishing module 1010 responds with the length of the file, flags indicating file type, and a URL to request streaming of the file.

Create Project: This message requests creation of a project, specified by pathname.

Rename File: This message renames a file from a specified source pathname to a specified destination pathname.

Delete File: This message deletes a file specified by pathname.

Security Module 1004: This module manages the various encryption processes provided by the content manager 112. These include encryption of media keys, and digital signing of certificates and other data. Key generation is preferably provided by RSA BSAFE key generation routine. Symmetric encryption of media keys is provided by RSA BSAFE PBE algorithm. Digital signature is provided by the MD5+RSA algorithm.

Commerce Module 1012: This module manages the transactions for previewing and purchasing media data files 200. This module interfaces with the security module 1004 to obtain encryption services, and with the database access module 1002 to obtain media information. The commerce module 1012 also determines which media data files 200 are available for sale.

The commerce module 1012 interfaces with the merchant server 132 to receive requests for purchases and to provide reservations. The commerce module 1012 interfaces with the merchant server 132 to provide and secure reservations for media data files.

The commerce module 1012 also delivers media vouchers 300 to the media players 116, including the generation and validation of receipt tokens and authorization tokens.

The commerce module 1012 also maintains a list of reserved and available for retrieval media files, including tracking of pending purchases, purchased and not delivered files, and purchased and delivered files. The commerce module 1012 exports the following functions:

Preview: This message sends a media ID 304 and obtains a media voucher 300 which includes the address and port of a delivery server 118 where the media may be streamed for preview and a voucher ID 302 used for tracking the transaction.

Reserve: This message sends a media ID 304, a quality indicator identifying the audio image 208 within the media data file to reserve, and the number of audio channels (e.g. "mono" or "stereo"). It receives back a voucher ID 302 for tracking the transaction, a timestamp for the start of the transaction, a timeout value representing the number of seconds for which the reservation is valid, an authorization string for modifying the reservation and a receipt string for the play to use in downloading the file.

Authorize: This message sends a voucher ID 302, an authorization string and a state value indicating that the reservation should be made available for download. It receives back a new authorization string for making further modifications to the reservation.

Expire: This message sends a voucher ID 302, and authorization string and a state value indicating that the reservation should be removed from the system.

Deliver: This message sends a voucher ID, 302 and a receipt 306. It receives back a media voucher 300 which includes the address and port of a delivery server 118 where the media may be downloaded, a voucher ID 302 used for tracking the transaction and a receipt 306 used to validate the media player 116 at time of delivery.

Administration Module 1006: This module defines the operation parameters of the system, including the number of delivery servers and the number of active streams allocated to each server, which ports are used by content manager 112 for network sending and receiving requests, and the number of songs available for purchase. This module also manages and tracks performance statistics, such as overall volume, throughput, and the like. The administration module 1006 exports the following functions:

Get Config: This message obtains the current configuration data in the form of a configuration file.

Set Config: This message uploads a configuration file to the content manager 112 to set the configuration.

CM Shutdown: This message shuts down the content manager 112.

DS Shutdown: This message shuts down the delivery server 118, specified by network address.

Delete DS Configuration: This message shuts down a delivery server 118, specified by network address, and removes the delivery server 118 from the content manager's configuration.

CM Statistics: This message requests system statistics. The administration module 1006 responds with:

Uptime: the amount of time the content manager 112 has been running.

Vouchers: the number of media vouchers 300 issued by the content manager 112.

CacheSize: a maximum number of media data files 200 that can be cached.

Items: the current number of media data files 200 in the cache.

Access: the total number of accesses to media data files 200.

Misses: the number of accesses to media data files 200 that were not in the cache. These three data values allows the system provider to detern-dne whether an increase in the cache size is appropriate.

In-cache: the number of access to media data files 200 currently in the cache.

DS: the number of delivery servers connected to the content manager 112.

DS Address n: the network address of the nth delivery server 118.

Streams n: the number of streams allocated to the nth delivery server 118.

Used n: the number of streams used by the nth delivery server 118.

Logging Module 1014: This module provides for error logging of errors during communications between the content manager 112 and other system components; purchase logging to log each purchase of a media data file 200; and preview logging to log each preview of a media data file. These logs are used by the right reporting module 1008 to generate and report sales, usages, and chargebacks of media data files 200.

Rights Reporting Module 1008: This module communicates with the rights agents 108 to report usage rates and totals for the various media data files 200 within the system. Rights reporting includes the identity of each media data file purchased or downloaded, the type of use, and any agency information or codes specifically designated for the media data file 200.

Certificate Update Module 1016: This module interfaces with the media licensing center 110 to receive updates of the certificate of the content manager 112. The certificate of the content manager 112 is issued with short validity periods, preferably about 1 to 2 weeks. This requires the content manager 112 to be re-certified on a regular basis, ensuring that the content manager 112 remains authenticated over time.

Delivery Server

Figure 11:
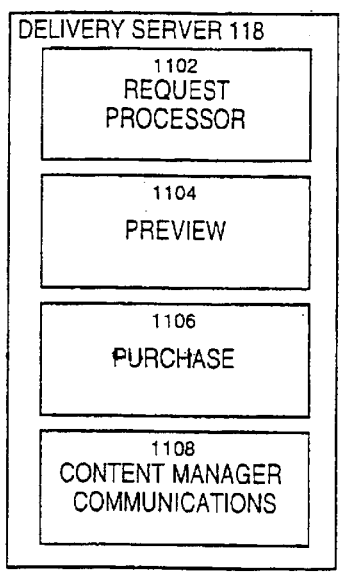
FIG. 11 is an illustration of the delivery server.

Referring to FIG. 11, there is shown the software architecture of one embodiment of a delivery server 118. The delivery server 118 includes a request processor 1102, a preview module 1104, purchase module 1106, and a content manager communications module 1108.

Request Processor 1102: This module handles requests from Web browser 128 to preview or purchase media data files. A request is sent to either the preview module 1104 or purchase module 1106, depending on the type of request, as encoded in the URL passed to the HTTP server 122. This module provides a DS Register function, registers the network address of the delivery server 118 with the content manager 112.

Content Manager Communications Module 1108: This module establishes an unsecure TCP connection to the content manager 112 to obtain configuration information, validate voucher IDs, obtain current media information, obtain purchase validation information and digital signing information.

Preview Module 1104: This module responds to requests to stream media data for real time playback of audio by the media player 116. This module provides the following functions:

Allocate Stream: this message is sent by the preview module 1104 to the content manager 112 to indicate that a stream has been allocated for a particular preview request. The message specifies the voucher ID for the request, the network address of the media player 116 to receive the stream, the requested bandwidth by the media player 1116, and the media ID for the file to be stream.

Release Stream: this message is sent by the preview module 1104 to the content manager 112 to release a stream following completion of a request. The message includes the voucher ID, error status, duration of the stream, and identity of the audio image that was streamed.

The module also implements a streaming protocol to stream the media data, based on RFC-1889, and RFC-1890, Real Time Transfer Protocol. The streaming protocol includes:

Initiate: this message is sent by a media player 116 to initiate a connection to the delivery server 118; the message includes the network address of the delivery server 118 (from the media voucher 300), the port of the player to receive the stream, bandwidth, voucher ID, and media ID.

Stream Ready: this message is sent by the delivery server 118 to the media player 116 to provide clip and song parameters for previewing a file, including lead-in and lead-out, fade-in and fadeout, bandwidth, and duration.

Actual streaming is managed by a transport control protocol. Transport messages describe specific times in the audio image 208 to be accessed to begin streaming playback. Since the delivery server 118 can only seek to well defined places in the audio image 208 (as defined in the index table), the media player 116 must first determine a nearest time to begin streaming. Accordingly, the preview module 1104 exports a Query Time function, which requests a desired starting time. The preview module 1104 responds to a Query Time function with a Neatest Time message indicating the time nearest to the desired starting time, and a number of bytes to be sent from the specified time to the end of a clip. A Transport function, taking a specified time (the nearest time response), instructs the preview module 1104 to begin streaming at the specified time.

Purchase Module 1106: This module manages a secure channel of communication based on a shared "secret" which is the receipt token that the security module 1004 generates as part of the media voucher 300. This module exports the following functions:

Redeem Initiate: This message is sent by the media player 116 to initialize a connection for the downloading a media data file 200.

Redeem Approved: This message is sent by the purchase module 1106 to the media player 116 if the purchase request is approved by validation of the encrypted validation information.

Redeem Start: This message is sent by the media player 116 to initiate the download itself.

Get Info: This message is sent by the purchase module 1106 to the content manager 112 to request the media descriptive data.

Redeem Data Transfer Done: This message is sent by the purchase module 1106 when all the data has been transferred.

Media Licensing Center

Figure 12:
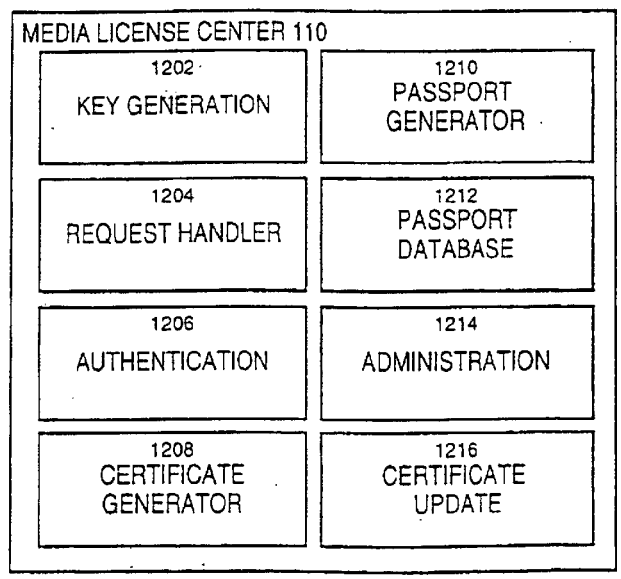
FIG. 12 is an illustration of the media licensing center.

The media licensing center 110 is responsible for the generation of certificates to the other system components, and the generation of key pairs for the media player 116. FIG. 12 illustrates one embodiment of the software architecture of the media licensing center 110. The media licensing center 110 includes the following modules:

Key Generation Module 1202: This module provides public/private key pairs for the media player 116 and possibly for content managers as well.

Request Handler Module 1204: This module deals with all external communication to the media licensing center 110. This may be via a Web page form for a user requesting a passport or a content manager 112 certificate that will be routed to the authentication module 1206 or for requesting recovery for a lost passport or a forgotten passphrase.

Authentication Module 1206: This module authenticates a user identity with some external system to verify address, and to separately validate credit card through a payment processing system 134 for requesting a passport. For content manager certificates it verifies that there is an account setup for the particular music distribution center 124 making the request.

Certificate Generation Module 1208: This module provides the certificates for all other system components; in this fashion the media licensing center 110 acts as a certificate authority. The certificates are preferably ISO X.509 compliant, and include the public key of the requesting entity (whether generated by that entity or by the key generation module 1202), information identifying the requesting entity, validity information, and a digital signature of the media licensing center 110. The digital signature is preferably generated according to RSA Laboratories' PKCS #1 specification. In particular, this module produces the consumer certificate 402 during registration 600.

Passport Generation Module 1210: This module receives a consumer certificate 402 from the certificate generation module 1208, the consumer's private key from the key generation module 1202, and user personal information from the Web browser 128 registration form, generates the registration key 420, and packages all of this data as a registration file to be delivered to the media player 116.

Certificate Database Module 1212: This module is a data repository for persistently storing pertinent consumer identifying information and the registration key to enable recovery of passports 400. It also stores account information for music distribution centers.

Administration Module 1214: This module generates reports on the number of passports 400 and certificates issued, currently valid certificates, and expired certificates, and the like.

Certificate Update Module 1216: The certificate issued by the certificate generation module 1208 will have varying validity periods. The validity period for consumer certificates is 1 year. The validity period for the content manager 112 and delivery server 118 is about 2 to 4 weeks. The certificate update module 1216 periodically reviews the passport database 1212 to determine which certificates have expired. It then authenticates the entities holding these certificates and issues new certificates.

Media Player

Figure 13:
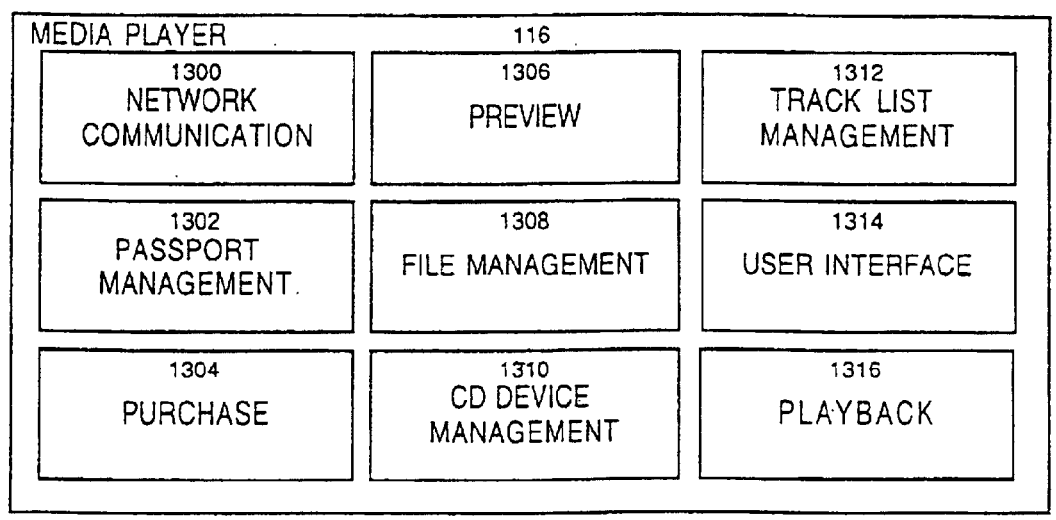
FIG. 13 is an illustration of the media player.

Referring to FIG. 13 there is shown an illustration of the software architecture of the media player 116. The media player 116 provides for decryption and playback of media data files, and for recording an audio data file from a media data file onto a recordable Compact Disc (CD) for later playback on conventional CD players. The media player 116 interfaces with the delivery server 118 to receive media data files. The media player 116 includes the following modules:

User Interface Module 1314: This module provides a user interface for controlling the playback of audio data including controls for playing, fast forwarding, reversing, pausing playback, and along with displays and controls for viewing time, time remaining, artist and track information, cover and promotional illustration art, and lyrics. These controls operate with respect to both streaming of audio data from a delivery server 118 during a preview transaction, and playback of locally stored audio data, including audio recorded by the user onto compact disk. The various controls invoke functions which generate the transport protocol and download protocol messages to the delivery server 118.

Network Communication Module 1300: This module manages the interface of the media player 116 with the network, including establishing TCP connections over either secure or unsecure channels with a delivery server 118 or its proxy. The network communication module 1300 provides functions establishing the connection, requesting media to preview or purchase, playback controls such as stop, start at time offset, and the like, and connection shutdown.

Passport Management Module 1302: This module is responsible for managing the user's passport. This module operates during registration of the media player 116, and during playback of audio data. During registration, the Web browser 128 receives via an SSL connection from the passport generation module 1210 of media licensing center 110 a registration file that contains the data to be used in a user's passport, and stores it locally in the client computer 126. The registration file is not encrypted. The Web browser 128 invokes the media player 116 and provides it with the file name and path of this registration file. The passport management module 1302 imports from this registration file the passport data and encrypts its with a user specified passphrase. During playback, the passport management module 1302 is used to first decrypt the passport using the passphrase, and then decrypt the media key stored therein using the user's private key. The media key is then used by the Playback Module 1316 to decrypt the encrypted audio data in a purchased media data file. In addition the passport management module 1302 decrypts the personal information 414 from the passport 400, including the user's name and confidential information, such as the credit card number, and provides it to the user interface module 1314 for display during playback.

Encryption of the audio images with the media key is provided with DES or RSA Data Security's RC4 algorithm. As the audio images are also compressed, the decompression algorithm typically consumes most of the computation resources.

Purchase Module 1304: This module is responsible for managing the purchase of media data files. This module interfaces with the Web browser 128 to receive therefrom a media voucher 300 identifying the media to be purchased and the delivery server 118 to fulfill delivery. This module then communicates with the delivery server 118 to securely download the media data file, including generation of download messages according to the delivery server 118 download protocols. The module also interfaces with the passport management module 1302 to obtain the consumer certificate 402 from the passport 400. The consumer certificate is provided to the delivery server 118, which passes it to the content manager 112 to encrypt the media key with the consumer's public key contained therein.

Preview Module 1306: This module manages the request and acquisition and real time streaming of media from the delivery server 118. The preview module 1306 interfaces with the delivery server 118 via the transport controls to stream media for previewing and free download.

File Management Module 1308: This module provides for reading and writing of media data files 200 to the local hard disk of the client computer system 126.

CD Device Management Module 1310: This module formats a media data file 200 for writing on CD-Recordable, or other writable device. Formatting includes decompression and formatting to Red Book standards. Preferably the decompressed data is kept encrypted before it's written to the device.

Track List Module 1312: This module organizes the user's media data files into various lists of media tracks, and provides a user interface to access and manage this information. This enables the user to create lists of media to be recorded to a CD or the like.

Playback Module 1316: This module is responsible for the actual playback of a media data file 200, including decryption of the audio image 208 using the media key. The playback module 1316 implements controls to start, stop, pause, reverse, and fast forward playback.

What is claimed is:

1. A computer-implemented online music distribution system for distributing digital media data files, including audio data, over a public communications network, comprising:

a content manager that transmits validation data uniquely associated with a purchase of a selected one of the media data files and a network address of a delivery server to deliver the selected media data file to a client computer system including a media player for playing back the audio data of the selected media data file;

the media player, storing encryption data assigned specifically to the media player, that receives the validation data from the content manager, and transmits the validation data to the delivery server specified by the network address in the validation data; and the delivery server that verifies the validation data received from the media player using the content manager and receives the selected media data file from the content manager and securely transmits the selected media data file to the media player, wherein the selected media data file includes the audio data of the selected media data file encrypted using the encryption data of the media player, the media player adapted to decrypt the audio data of the selected media data file using the encryption data, and playback resulting decrypted audio data.

2. The system of claim 1, further comprising:

a media licensing center that generates for each of a plurality of purchasers a digital passport including:
(i) a public key/private key pair for a respective one of a plurality of media players, including the first-mentioned media player, used by the purchaser,
(ii) a consumer certificate,
(iii) personal information identifying the purchaser, and
(iv) confidential information of the purchaser;

and transmits the digital passport of each purchaser to the respective media player of the purchaser, wherein each of the respective media players stores the passport in a local memory, to provide a public key of the public key/private key pair to the content manager as part of the encryption data.

3. The system of claim 1, wherein:

the content manager receives from a merchant server a request to reserve the selected media data file for the purchase, and receives authorization from the merchant server to transmit the validation data to the client computer system.

4. The system of claim 1, wherein the content manager:

receives the selected media data file from an authoring tool, the selected media data file including one or more audio images encrypted with a media key, the media key encrypted with a public key of the content manager to form an encrypted media key;

parses the selected media data file and selectively imports data of the selected media data file into a database;

stores the selected media data file, and the encrypted media key in a local file system.

5. The system of claim 1, further comprising:

a media information database that stores information descriptive of each of the media data files; and a media data file system that stores each of the media data files encrypted with a corresponding media key associated with the media data file, the media keys encrypted with the public key of the content manager.

6. The system of claim 1, wherein each of the media data files includes:

at least one encrypted audio image containing a full length high quality version of a song; and at least one un-encrypted audio image containing a lower quality version of the song.

7. The system of claim 1, wherein:

the client computer system requests a preview of the selected media data file prior to the purchase of the selected media data file;

the content manager authorizes the delivery server to stream at least one un-encrypted audio image to the media player on the client computer system; and the media player receives the un-encrypted audio image from the delivery server and plays the un-encrypted audio image as a preview of the media data file.

8. The system of claim 7, wherein:

upon request from the client computer system for the preview of the selected media data file, the content manager queries a database system for media descriptive data about the selected media data file to be provided to the media player; and responsive to the media descriptive data being present in the database system, the content manager delivers the media descriptive data to the delivery server for subsequent transmission to the client computer system.

9. The system of claim 1, further comprising:

a secure transaction log that securely stores purchase information for each purchase of each of the media data files.

10. The system of claim 9, wherein the secure transaction log includes a plurality of log entries of purchases of the media data files, each log entry encrypted with an associated encryption key.

11. A computer implemented online music distribution system for distributing digital media data files, including audio data, over a public communications network, comprising:

a content manager that (i) stores a plurality of media data files, each media data file including at least one encrypted high quality full length audio data file and at least one unencrypted low quality audio data file, and (ii) transmits validation data uniquely associated with a preview of a selected one of the media data files and a network address of a delivery server to deliver the selected media data file to a client computer system including a media player for playing back the audio data of the previewed media data file;

the media player that receives the validation data from the content manager and transmits the validation data to the delivery server specified by the network address in the validation data; and the delivery server that verifies the validation data received from the media player using the content manager to validate the preview of the media data file by the media player and receives the selected media data file from the content manager and retransmits the selected media data file to the media player, wherein the selected media data file includes the unencrypted low quality audio data, the media player adapted to playback the unencrypted low quality audio data as the preview of the selected media data file as the unencrypted audio data is received.

12. A method for distributing digital content through a computer network, the method comprising:
receiving a request to authorize delivery of one or more purchased items of digital content to a purchaser;
sending voucher data which authorizes delivery of the one or more purchased items of digital content to the purchaser and identifies a delivery server to conduct the delivery;
receiving a verification request from the delivery server to verify the voucher data;
verifying that the voucher data represents delivery to the purchaser; and
sending authorization to the delivery server to deliver the one or more purchased items of digital content to the purchaser after the delivery server verifies validation data received from a media player using a content manager and receives the one or more purchased items from the content manager, the delivery server securely retransmitting the one or more purchased items to the media payer.

13. The method of claim 12 wherein the one or more purchased items of digital content include audio content.

14. The method of claim 12 wherein the one or more purchased items of digital content include video content.

15. The method of claim 12 wherein the one or more purchased items of digital content include image content.

16. The method of claim 12 wherein the one or more purchased items of digital content include computer software.

17. The method of claim 12 wherein the voucher data identifies the one or more purchased items of digital content.

18. The method of claim 12 wherein the voucher data includes a transaction identifier which identifies a purchase transaction in which the purchaser has purchased the one or more purchased items of digital content.

19. The method of claim 12 wherein the voucher data identifies the one or more purchased items of digital content.

20. The method of claim 12 wherein verifying comprises:
decrypting a voucher identifier of the voucher data with a token of the voucher data.

21. The method of claim 12 wherein verifying comprises:
verifying a cryptographic signature of at least a part of the voucher data by the purchaser.

22. The method of claim 12 further comprising:
receiving a request from a merchant server indicating that the one or more items of digital content are the subject of a purchase transaction;
confirming the availability of the one or more items of digital content; and
sending delivery authorization data to the merchant server for use by the purchaser.

23. The method of claim 22 wherein confirming comprises:
sending confirmation data to the merchant server.

24. The method of claim 22 further comprising:
receiving notification from the merchant server that payment for the one or more items of digital content has been authorized.

25. The method of claim 22 wherein the authorization data is included in the request to authorize delivery.

26. A method for distributing digital content through a computer network, the method comprising:
receiving a delivery request to deliver one or more items of digital content to a purchaser wherein the delivery request includes transaction data which represents a transaction in which the purchaser purchased the one or more items of digital content;
submitting the transaction data to a content manager for verification of the authority of the purchaser to receive the one or more items of digital content; and
upon receiving the verification from the content manager, verifying validation data received from a media player using the content manager and receiving the one or more items of digital content from the content manager, and sending the one or more items of digital content to the purchaser.

27. The method of claim 26 wherein the one or more items of digital content include audio content.

28. The method of claim 26 wherein the one or more items of digital content include video content.

29. The method of claim 26 wherein the one or more items of digital content include image content.

30. The method of claim 26 wherein the one or more items of digital content include computer software.

31. The method of claim 26 wherein the transaction data includes a transaction identifier which identifies the transaction.

32. The method of claim 26 wherein the transaction data identifies the one or more items of digital content.

33. The method of claim 26 wherein verifying comprises:
decrypting a transaction identifier of the transaction data with a token of the transaction data.

34. The method of claim 26 wherein verifying comprises:
verifying a cryptographic signature of at least a part of the transaction data by the purchaser.

35. A method for distributing digital content through a computer network, the method comprising:
receiving a request to authorize delivery of one or more preview items of digital content to a user;
sending voucher data which authorizes delivery of the one or more preview items of digital content to the user and identifies a delivery server to conduct the delivery;
receiving a verification request from the delivery server to verify the voucher data;
verifying that the voucher data represents delivery to the user; and
sending authorization to the delivery server to deliver the one or more preview items of digital content to the user, after the delivery service verifies validation data received from a media player using a content manager and receives the one or more preview items of digital content from the content manager, the delivery server retransmitting the one or more preview items of digital content to the media player.

36. The method of claim 35 wherein the one or more preview items of digital content include audio content.

37. A method for distributing digital content through a computer network, the method comprising:
receiving a delivery request to deliver one or more items of digital content to a user wherein the delivery request includes transaction data which represents a transaction in which the user has requested preview of the one or more items of digital content;
submitting the transaction data to a content manager for verification of the authority of the user to preview the one or more items of digital content;

upon receiving the verification from the content manager, verifying validation data received from a media player using the content manager and receiving the preview data of one or more items of digital content from the content manager, and sending preview data of the one or more items of digital content to the user.

38. The method of claim 37 wherein the one or more items of digital content include audio content.

39. A computer readable medium useful in association with a computer which includes a processor and a memory, the computer readable medium including computer instructions which are configured to cause the computer to distribute digital content through a computer network by:

receiving a request to authorize delivery of one or more purchased items of digital content to a purchaser;

sending voucher data which authorizes delivery of the one or more purchased items of digital content to the purchaser and identifies a delivery server to conduct the delivery;

receiving a verification request from the delivery server to verify the voucher data;

verifying that the voucher data represents delivery to the purchaser; and sending authorization to the delivery server to deliver the one or more purchased items of digital content to the purchaser after the delivery server verifies validation data received from a media player using a content manager and receives the one or more purchased items from the content manager, the delivery server securely retransmitting the one or more purchased items to the media payer.

40. The computer readable medium of claim 39 wherein the one or more purchased items of digital content include audio content.

41. The computer readable medium of claim 39 wherein the one or more purchased items of digital content include video content.

42. The computer readable medium of claim 39 wherein the one or more purchased items of digital content include image content.

43. The computer readable medium of claim 39 wherein the one or more purchased items of digital content include computer software.

44. The computer readable medium of claim 39 wherein the voucher data identifies the one or more purchased items of digital content.

45. The computer readable medium of claim 39 wherein the voucher data includes a transaction identifier which identifies a purchase transaction in which the purchaser has purchased the one or more purchased items of digital content.

46. The computer readable medium of claim 39 wherein the voucher data identifies the one or more purchased items of digital content.

47. The computer readable medium of claim 39 wherein verifying comprises:

decrypting a voucher identifier of the voucher data with a token of the voucher data.

48. The computer readable medium of claim 39 wherein verifying comprises:

verifying a cryptographic signature of at least a part of the voucher data by the purchaser.

49. The computer readable medium of claim 39 wherein the computer instructions are configured to cause the computer to distribute digital content through a computer network by also:

receiving a request from a merchant server indicating that the one or more items of digital content are the subject of a purchase transaction;

confirming the availability of the one or more items of digital content; and sending delivery authorization data to the merchant server for use by the purchaser.

50. The computer readable medium of claim 49 wherein confirming comprises:

sending confirmation data to the merchant server.

51. The computer readable medium of claim 49 wherein the computer instructions are configured to cause the computer to distribute digital content through a computer network by also:

receiving notification from the merchant server that payment for the one or more items of digital content has been authorized.

52. The computer readable medium of claim 49 wherein the authorization data is included in the request to authorize delivery.

53. A computer readable medium useful in association with a computer which includes a processor and a memory, the computer readable medium including computer instructions which are configured to cause the computer to distribute digital content through a computer network by:

receiving a delivery request to deliver one or more items of digital content to a purchaser wherein the delivery request includes transaction data which represents a transaction in which the purchaser purchased the one or more items of digital content;

submitting the transaction data to a content manager for verification of the authority of the purchaser to receive the one or more items of digital content; and upon receiving the verification from the content manager, verifying validation data received from a media player using the content manager and receiving the one or more items of digital content from the content manager, and sending the one or more items of digital content to the purchaser.

54. The computer readable medium of claim 53 wherein the one or more items of digital content include audio content.

55. The computer readable medium of claim 53 wherein the one or more items of digital content include video content.

56. The computer readable medium of claim 53 wherein the one or more items of digital content include image content.

57. The computer readable medium of claim 53 wherein the one or more items of digital content include computer software.

58. The computer readable medium of claim 53 wherein the transaction data includes a transaction identifier which identifies the transaction.

59. The computer readable medium of claim 53 wherein the transaction data identifies the one or more items of digital content.

60. The computer readable medium of claim 53 wherein verifying comprises:

decrypting a transaction identifier of the transaction data with a token of the transaction data.

61. The computer readable medium of claim 53 wherein verifying comprises:

verifying a cryptographic signature of at least a part of the transaction data by the purchaser.

62. A computer readable medium useful in association with a computer which includes a processor and a memory, the computer readable medium including computer instructions which are configured, to cause the computer to distribute digital content through a computer network by:

receiving a request to authorize delivery of one or more preview items of digital content to a user, sending voucher data which authorizes delivery of the one or more preview items of digital content to the user and identifies a delivery server to conduct the delivery;

receiving a verification request from the delivery server to verify the voucher data;

verifying that the voucher data represents delivery to the user, and sending authorization to the delivery server to deliver the one or more preview items of digital content to the user, after the delivery service verifies validation data received from a media player using a content manager and receiving the one or more preview items of digital content from the content manager and retransmitting the one or more preview items of digital content to the media player.

63. The computer readable medium of claim 62 wherein the one or more preview items of digital content include audio content.

64. A computer readable medium useful in association with a computer which includes a processor and a memory, the computer readable medium including computer instructions which are configured to cause the computer to distribute digital content through a computer network by:

receiving a delivery request to deliver one or more items of digital content to a user herein the delivery request includes transaction data which represents a transaction in which the user has requested preview of the one or more items of digital content;

submitting the transaction data to a content manager for verification of the authority of the user to preview the one or more items of digital content;

upon receiving the verification from the content manager, verifying validation data received from a media player using the content manager and receiving the one or more items of digital content from the content manager receiving preview data of the one or more items of digital content; and sending preview data of the one or more items of digital content to the user.

65. The computer readable medium of claim 64 wherein the one or more items of digital content include audio content.

66. A computer system comprising:

a processor;

a memory operatively coupled to the processor; and a content manager (i) which executes in the processor from the memory and {ii) which, when executed by the processor, causes the computer to distribute digital content through a computer network by:

receiving a request to authorize delivery of one or more purchased items of digital content to a purchaser;

sending voucher data which authorizes delivery of the one or more purchased items of digital content to the purchaser and identifies a delivery server to conduct the delivery;

receiving a verification request from the delivery server to verify the voucher data;

verifying that the voucher data represents delivery to the purchaser; and sending authorization to the delivery server to deliver the one or more preview items of digital content to the user, after the delivery service verifies validation data received from a media player using a content manager and receiving the one or more preview items of digital content from the content manager and retransmitting the one or more preview items of digital content to the media player.

67. The computer system of claim 66 wherein the one or more purchased items of digital content include audio content.

68. The computer system of claim 66 wherein the one or more purchased items of digital content include video content.

69. The computer system of claim 66 wherein the one or more purchased items of digital content include image content.

70. The computer system of claim 66 wherein the one or more purchased items of digital content include computer software.

71. The computer system of claim 66 wherein the voucher data identifies the one or more purchased items of digital content.

72. The computer system of claim 66 wherein the voucher data includes a transaction identifier which identifies a purchase transaction in which the purchaser has purchased the one or more purchased items of digital content.

73. The computer system of claim 66 wherein the voucher data identifies the one or more purchased items of digital content.

74. The computer system of claim 66 wherein verifying comprises:

decrypting a voucher identifier of the voucher data with a token of the voucher data.

75. The computer system of claim 66 wherein verifying comprises:

verifying a cryptographic signature of at least a part of the voucher data by the purchaser.

76. The computer system of claim 66 wherein the content manager, when executed, causes the computer to distribute digital content through a computer network by also:

receiving a request from a merchant server indicating that the one or more items of digital content are the subject of a purchase transaction;

confirming the availability of the one or more items of digital content; and sending delivery authorization data to the merchant server for use by the purchaser.

77. The computer system of claim 76 wherein confirming comprises:

sending confirmation data to the merchant server.

78. The computer system of claim 76 wherein the content manager, when executed, causes the computer to distribute digital content through a computer network by also:

receiving notification from the merchant server that payment for the one or more items of digital content has been authorized.

79. The computer system of claim 76 wherein the authorization data is included in the request to authorize delivery.

80. A computer system comprising:

a processor;

a memory operatively coupled to the processor, and a delivery server (i) which executes in the processor from the memory and (ii) which, when executed by the processor, causes the computer to distribute digital content through a computer network by:

receiving a delivery request to deliver one or more items of digital content to a purchaser wherein the delivery request includes transaction data which represents a transaction in which the purchaser purchased the one or more items of digital content;

submitting the transaction data to a content manager for verification of the authority of the purchaser to receive the one or more items of digital content; and upon receiving the verification from the content manager, verifying validation data received from a media player using the content manager and receiving the one or more items of digital content from the content manager, and sending the one or more items of digital content to the purchaser.

81. The computer system of claim 80 wherein the one or more items of digital content include audio content.

82. The computer system of claim 80 wherein the one or more items of digital content include video content.

83. The computer system of claim 80 wherein the one or more items of digital content include image content.

84. The computer system of claim 80 wherein the one or more items of digital content include computer software.

85. The computer system of claim 80 wherein the transaction data includes a transaction identifier which identifies the transaction.

86. The computer system of claim 80 wherein the transaction data identifies the one or more items of digital content.

87. The computer system of claim 80 wherein verifying comprises:

decrypting a transaction identifier of the transaction data with a token of the transaction data.

88. The computer system of claim 80 wherein verifying comprises:

verifying a cryptographic signature of at least a part of the transaction data by the purchaser.

89. A computer system comprising:

a processor;

a memory operatively coupled to the processor; and a content manager (i) which executes in the processor from the memory and (ii)which, when executed by the processor, causes the computer to distribute digital content through a computer network by:

receiving a request to authorize delivery of one or more preview items of digital content to a user;

sending voucher data which authorizes delivery of the one or more preview items of digital content to the user and identifies a delivery server to conduct the delivery;

receiving a verification request from the delivery server to verify the voucher data;

verifying that the voucher data represents delivery to the user; and sending authorization to the delivery server to deliver the one or more preview items of digital content to the user, after the delivery service verifies validation data received from a media player using a content manager and receiving the one or more preview items of digital content from the content manager and retransmitting the one or more preview items of digital content to the media player.

90. The computer system of claim 89 wherein the one or more preview items of digital content include audio content.

91. A computer system comprising:

a processor, a memory operatively coupled to the processor; and a delivery server (i) which executes in the processor from the memory and (ii) which, when executed by the processor, causes the computer to distribute digital content through a computer network by:

receiving a delivery request to deliver one or more items of digital content to a user wherein the delivery request includes transaction data which represents a transaction in which the user has requested preview of the one or more items of digital content;

submitting the transaction data to a content manager for verification of the authority of the user to preview the one or more items of digital content;

upon receiving the verification from the content manager, verifying validation data received from a media player using the content manager and receiving the one or more items of digital content from the content manager receiving preview data of the one or more items of digital content; and sending preview data of the one or more items of digital content to the user.

92. The computer system of claim 91 wherein the one or more items of digital content include audio content.

* * * * *